United States Patent
Kamekawa

(10) Patent No.: US 11,039,023 B2
(45) Date of Patent: Jun. 15, 2021

(54) INFORMATION PROCESSING APPARATUS, CONTROL METHOD, AND STORAGE MEDIUM THEREOF

(71) Applicant: CANON KABUSHIKI KAISHA, Tokyo (JP)

(72) Inventor: Mikihiko Kamekawa, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/444,271

(22) Filed: Jun. 18, 2019

(65) Prior Publication Data
US 2020/0021697 A1    Jan. 16, 2020

(30) Foreign Application Priority Data

Jul. 10, 2018    (JP) .............................. JP2018-131010

(51) Int. Cl.
    H04N 1/00         (2006.01)
(52) U.S. Cl.
    CPC ..... H04N 1/00384 (2013.01); H04N 1/00411 (2013.01)
(58) Field of Classification Search
    None
    See application file for complete search history.

(56) References Cited

U.S. PATENT DOCUMENTS

| | | | | | |
|---|---|---|---|---|---|
| 6,160,926 | A * | 12/2000 | Dow | ................... | H04N 1/00384 382/313 |
| 7,260,730 | B2 * | 8/2007 | Sakaue | ................ | G06F 1/3203 358/305 |
| 10,122,926 | B2 * | 11/2018 | Okada | ................... | G06F 3/0482 |
| 10,148,829 | B2 * | 12/2018 | Yasuzaki | ............ | H04N 1/00896 |
| 2002/0013905 | A1 * | 1/2002 | Hamada | ................... | G06F 21/10 713/185 |
| 2002/0060816 | A1 * | 5/2002 | Dow | ................... | H04N 1/00413 358/302 |
| 2004/0215671 | A1 * | 10/2004 | Hyakutake | .............. | G06F 16/93 |
| 2005/0139673 | A1 * | 6/2005 | Yokoyama | ......... | H04N 1/00416 235/454 |
| 2005/0207730 | A1 * | 9/2005 | Iwamura | .............. | H04N 5/4401 386/257 |
| 2006/0174054 | A1 * | 8/2006 | Matsuki | ................ | G06F 16/166 711/100 |
| 2007/0171449 | A1 * | 7/2007 | Tanno | ................ | H04N 1/32053 358/1.13 |
| 2007/0206211 | A1 * | 9/2007 | Okutsu | .................. | G03G 15/50 358/1.14 |
| 2008/0068647 | A1 * | 3/2008 | Isobe | ................. | H04N 1/00501 358/1.15 |

(Continued)

FOREIGN PATENT DOCUMENTS

JP          5423596 B2     2/2014

*Primary Examiner* — Anh-Vinh T Nguyen
(74) *Attorney, Agent, or Firm* — Canon U.S.A., Inc. I.P. Division

(57) ABSTRACT

An information processing apparatus includes a generation unit and a determination unit. In a case where the determination unit determines that a second processing button has been generated, the generation unit generates a fourth processing button for executing a new plurality of processes in which a process corresponding to a third processing button among a plurality of processes is replaced with a process corresponding to a first processing button.

11 Claims, 18 Drawing Sheets

(56) References Cited

U.S. PATENT DOCUMENTS

| | | | | |
|---|---|---|---|---|
| 2008/0291283 | A1* | 11/2008 | Achiwa | G06F 3/0416 348/207.2 |
| 2008/0307319 | A1* | 12/2008 | Iwata | G06K 15/007 715/748 |
| 2010/0007908 | A1* | 1/2010 | Homma | G06F 3/121 358/1.14 |
| 2010/0238481 | A1* | 9/2010 | Homma | H04N 1/00244 358/1.14 |
| 2010/0269063 | A1* | 10/2010 | Takazawa | G06F 3/1204 715/810 |
| 2010/0290068 | A1* | 11/2010 | Okada | G03G 15/50 358/1.9 |
| 2011/0002014 | A1* | 1/2011 | Tani | H04N 1/0035 358/403 |
| 2011/0022954 | A1* | 1/2011 | Kamiya | G06T 1/20 715/274 |
| 2011/0035671 | A1* | 2/2011 | Iwai | H04N 1/00347 715/728 |
| 2011/0051190 | A1* | 3/2011 | Abe | H04N 1/00474 358/1.15 |
| 2011/0134453 | A1* | 6/2011 | Sakiyama | H04L 67/02 358/1.13 |
| 2011/0279856 | A1* | 11/2011 | Yamazaki | H04N 1/00204 358/1.15 |
| 2012/0030585 | A1* | 2/2012 | Akuzawa | H04N 1/00222 715/747 |
| 2013/0003100 | A1* | 1/2013 | Miyazawa | H04N 1/00464 358/1.13 |
| 2013/0100470 | A1* | 4/2013 | Kumagai | H04N 1/2338 358/1.9 |
| 2013/0103675 | A1* | 4/2013 | Tanaka | G06F 16/14 707/722 |
| 2013/0229690 | A1* | 9/2013 | Sumita | H04N 1/00408 358/1.15 |
| 2014/0218762 | A1* | 8/2014 | Abe | G06F 3/1288 358/1.15 |
| 2014/0242915 | A1* | 8/2014 | Watanabe | H04W 12/50 455/66.1 |
| 2015/0116760 | A1* | 4/2015 | Kim | H04N 1/00424 358/1.15 |
| 2015/0212762 | A1* | 7/2015 | Nakamura | H04N 1/0049 358/1.15 |
| 2016/0277606 | A1* | 9/2016 | Kitaguchi | H04N 1/00458 |
| 2016/0309052 | A1* | 10/2016 | Takahashi | G06F 3/1204 |
| 2017/0078511 | A1* | 3/2017 | Hasegawa | G06F 3/123 |
| 2017/0085731 | A1* | 3/2017 | Akuzawa | H04N 1/00411 |
| 2017/0134608 | A1* | 5/2017 | Hayano | G06K 15/4095 |
| 2017/0346982 | A1* | 11/2017 | Yamada | H04N 1/32539 |
| 2018/0032292 | A1* | 2/2018 | Sasaki | G06F 3/1205 |
| 2018/0074769 | A1* | 3/2018 | Hirose | H04N 1/00222 |
| 2018/0213098 | A1* | 7/2018 | Ito | H04N 1/00474 |
| 2018/0285027 | A1* | 10/2018 | Okajima | G06F 3/1204 |
| 2019/0095151 | A1* | 3/2019 | Inoue | H04N 1/00464 |
| 2020/0068086 | A1* | 2/2020 | Chimura | H04N 1/00954 |
| 2020/0244826 | A1* | 7/2020 | Ido | H04N 1/00129 |
| 2020/0329176 | A1* | 10/2020 | Bindana | H04N 1/00411 |

* cited by examiner

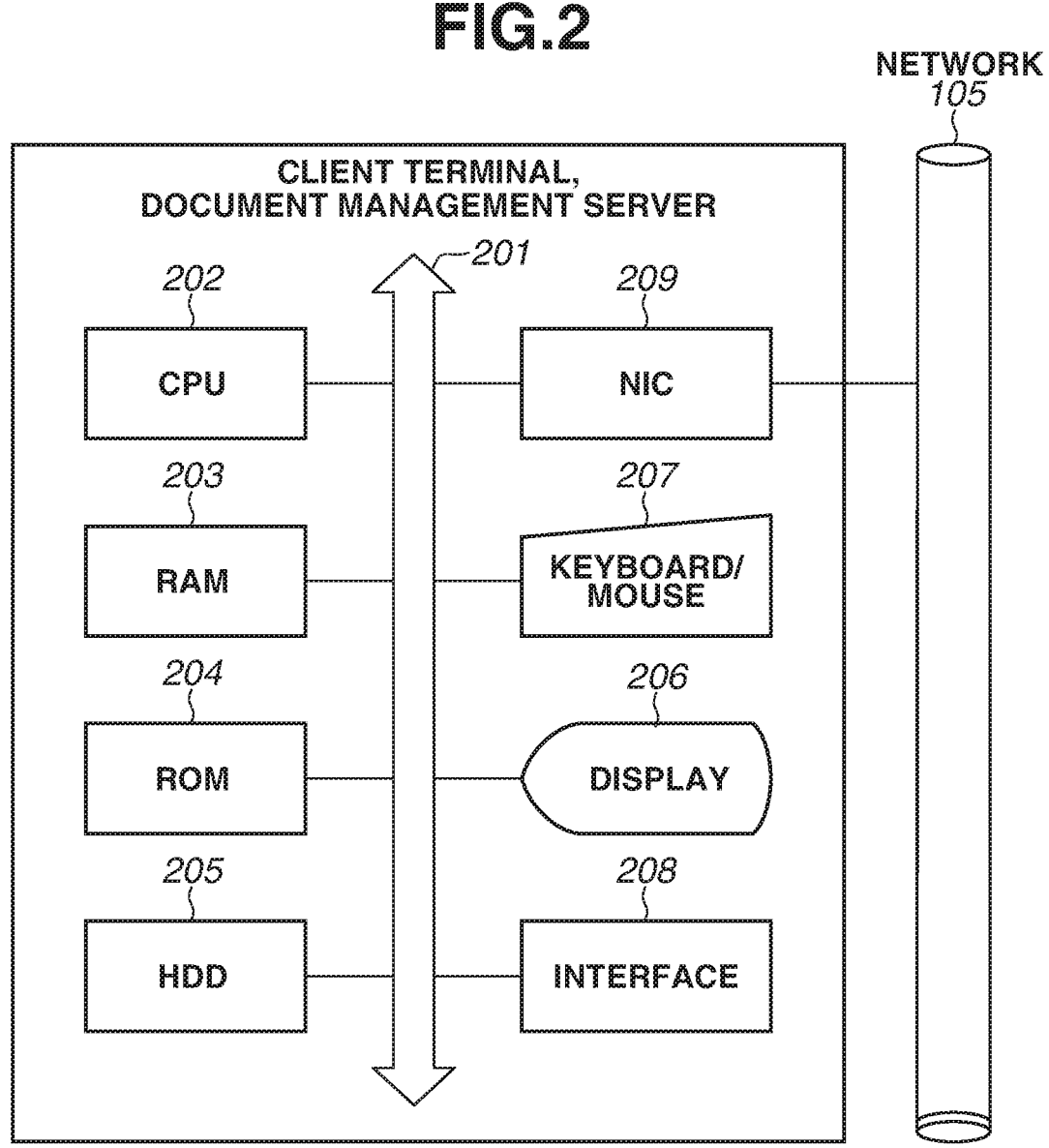

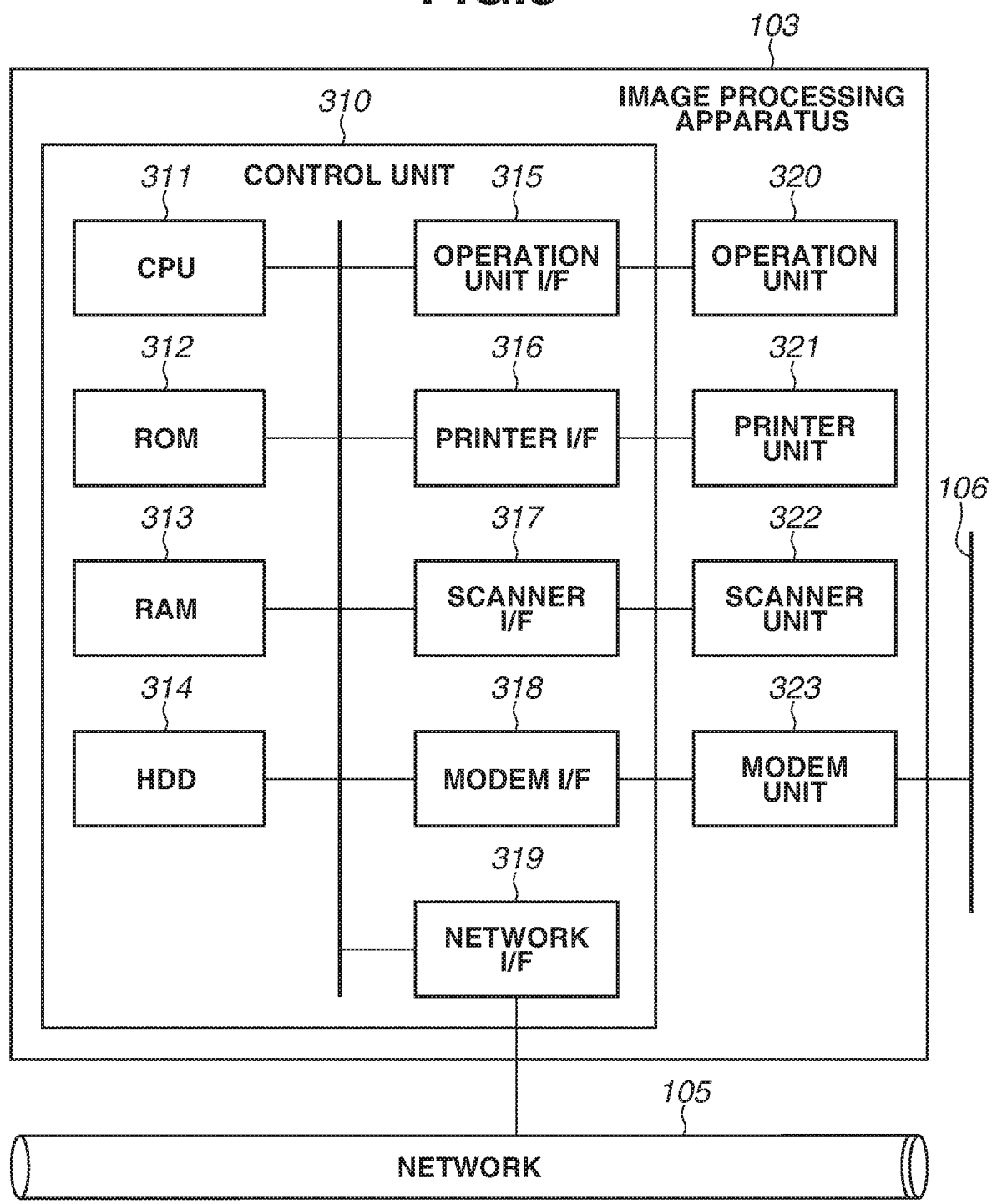

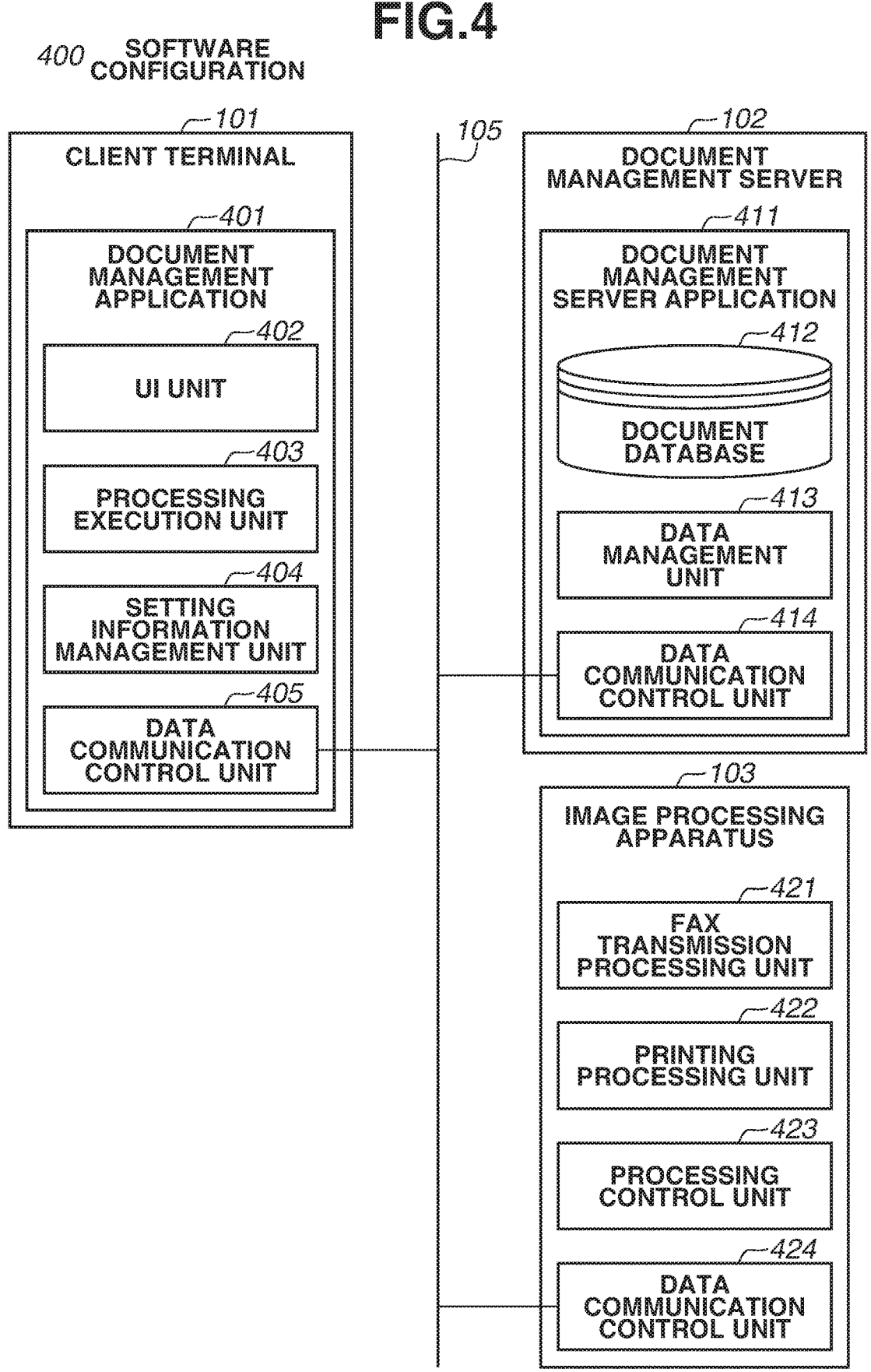

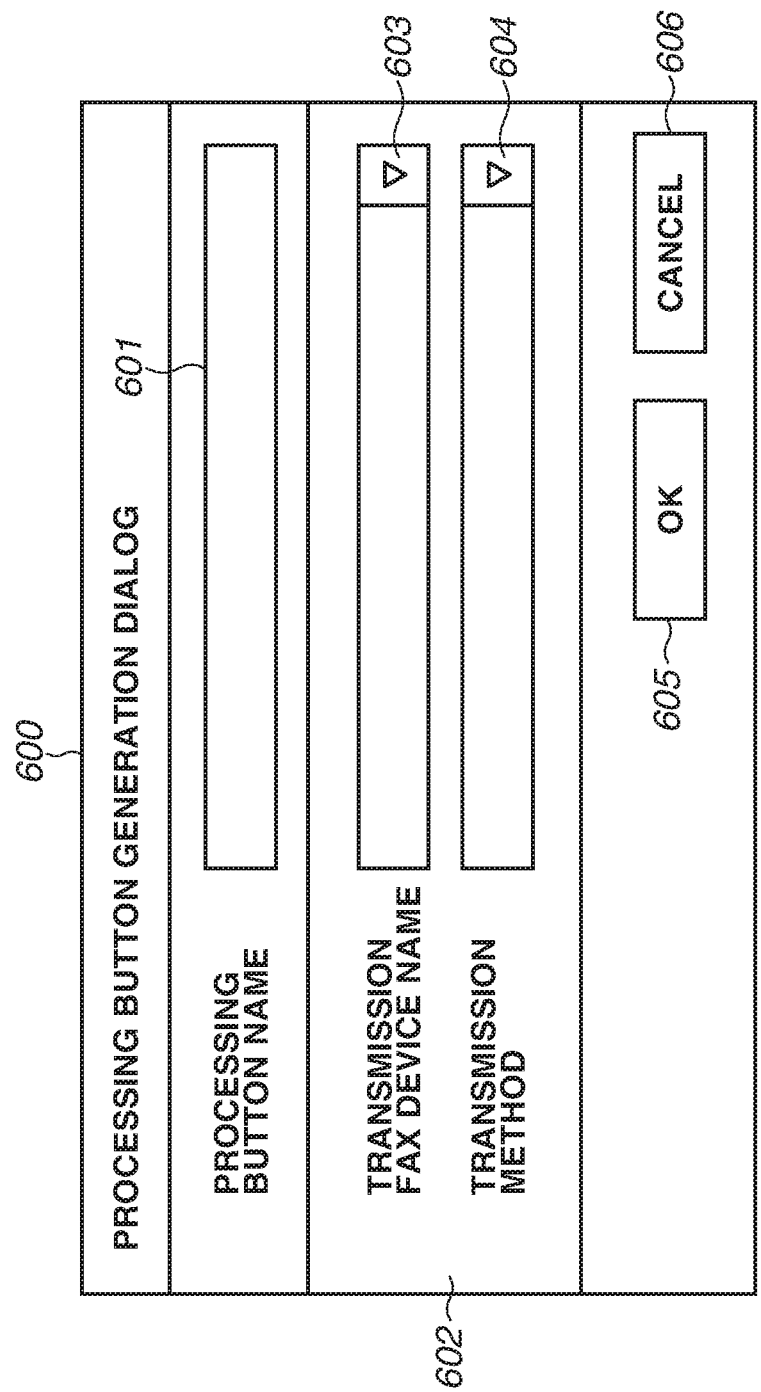

FIG.7

```
                                        701                                      700
     <OutputButton functionName="Fax">
702—<ID>P-004</ID>                                                        704
703—<DisplayName>TransmitFax(MFP2)/DisplayName>
     <UserImageFilePath>C:\Users\UserA\Pictures\ButtonImage.jpg</UserImageFilePath>
705—<Attributes>
       <FaxName>MFP-4000</FaxName>
        <FaxSendType>Individually</FaxSendType>
       </Attributes>
     </OutputButton>
```

INFORMATION PROCESSING APPARATUS, CONTROL METHOD, AND STORAGE MEDIUM THEREOF

BACKGROUND

Field

The disclosure relates to an information processing apparatus, a control method, and a storage medium thereof for automatically performing an operation to be performed on a document file.

Description of Related Art

There is a conventional method for storing, on a server (e.g., file server, document management server), document data generated by digitalizing paper documents used in business and document data generated using an office application. The document data is not only stored on the server but also edited or externally transmitted, and a document management application for executing such operations is widely used.

An operation to be performed using the document management application can be a plurality of operations with a predetermined procedure. Examples of the operation include fax transmission of document data, index change, file name update, and file move. Japanese Patent No. 5423596 discusses a user interface on which a plurality of buttons respectively corresponding to operations to be performed on document data is prepared and arranged in a sequential order of execution.

SUMMARY

According to an aspect of the disclosure, an information processing apparatus includes a generation unit and a determination unit. The generation unit is configured to generate a first processing button for executing a first process on document data based on first setting content and a second processing button for executing a plurality of processes. The determination unit is configured to determine, in a case where a process corresponding to the first processing button is designated by a user operation, whether the second processing button has been generated yet. The plurality of processes includes a process corresponding to a third processing button for executing the first process on the document data based on second setting content different from the first setting content. In a case where the determination unit determines that the second processing button has been generated, the generation unit generates a fourth processing button for executing a new plurality of processes in which the process corresponding to the third processing button among the plurality of processes is replaced with the process corresponding to the first processing button.

Further features of the disclosure will become apparent from the following description of exemplary embodiments with reference to the attached drawings.

BRIEF DESCRIPTION OF THE DRAWINGS

FIG. 2 is a block diagram illustrating a hardware configuration of a client apparatus and a document management server.

FIG. 3 is a block diagram illustrating a hardware configuration of an image processing apparatus.

FIG. 4 is a block diagram illustrating a software configuration of the client apparatus, the document management server, and the image processing apparatus.

FIG. 6 is a block diagram illustrating an example of a dialog for generating a processing button.

FIG. 7 is a diagram illustrating an example of single processing button information.

DESCRIPTION OF EMBODIMENTS

The technique discussed in Japanese Patent No. 5423596 requires a user to press a button (hereinafter, referred to as a "single processing button") corresponding to an operation one by one in order to execute a series of operations with a predetermined sequential order, and this is bothersome to the user. A possible method for overcoming the bothersome requirement is a method in which the series of operations is implemented by a single button (hereinafter, referred to as a "batch processing button"). For example, a batch processing button for automatically executing a series of operations such as fax transmission to a device A, index change, file name update, and file move to a folder B is generated in advance by a user, and the series of operations is executed at a press of the batch processing button.

However, if the user desires to execute a process that is partly different from the process corresponding to the batch processing button, a new batch processing button corresponding to the different process is created from scratch. The process that is partly different is specifically a situation in which a process of the "fax transmission to the device A" included in the batch processing button is a user-desired process of "fax transmission to a device B". More specifically, a process that is the same in processing content, which is the "fax transmission", but is different in setting content relating to execution of the process, such as a fax transmission destination, is referred to as the process that is partly different.

The disclosure features, among other things, a technique wherein user designation of a process that is partly different from a process corresponding to an existing batch processing button triggers generation of a batch processing button containing the user-designated process.

According to an aspect of the disclosure, in a case of executing a process that is partly different from a process corresponding to an existing batch processing button, user designation of a process that is different triggers generation of a batch processing button containing the designated process.

Various exemplary embodiments will be described below with reference to the drawings.

<<System Configuration>>

Figure 1:
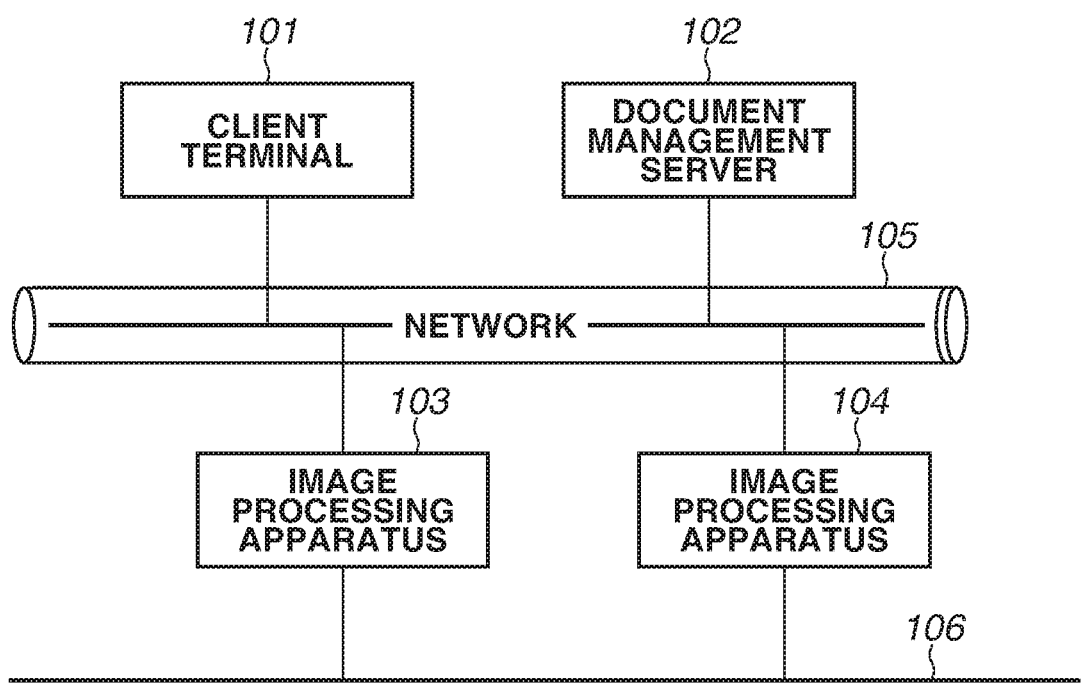
FIG. 1 is a block diagram illustrating an entire system configuration.

FIG. 1 is a block diagram illustrating a system configuration according to a first exemplary embodiment. A client terminal 101, a document management server 102, and image processing apparatuses 103 and 104 are connected via a network 105. The image processing apparatus 103 and the image processing apparatus 104 are also connected to a public line 106 in addition to the network 105.

The client terminal 101 connects with the document management server 102 and includes a function of operating document data stored in the document management server 102. The client terminal 101 also connects with the image processing apparatuses 103 and 104 and uses functions of the image processing apparatuses 103 and 104 (in the present exemplary embodiment, a function of printing a document file and a function of transmitting a fax to an external fax apparatus). The client terminal 101 is implemented by, for example, a desktop personal computer, a laptop personal computer, a mobile personal computer, a tablet terminal, or a mobile phone, and a plurality of client terminals 101 can be connected to the network 105.

The document management server 102 stores document data in association with attribute information for identifying the document data, and includes a function of providing the requested document data and the requested attribute information in response to a request from the client terminal 101.

The image processing apparatus 103 is a multi-function peripheral including an operation unit, a scanner unit, a printer unit, and a fax unit. The system according to the present exemplary embodiment uses a document data print function and a fax transmission function. Thus, the image processing apparatus 103 according to the present exemplary embodiment is not limited to the multi-function peripheral and can also be an apparatus that includes a print function and a fax transmission function. The image processing apparatus 104 is an apparatus that includes similar functions to the functions of the image processing apparatus 103.

While a case where the user uses different image processing apparatuses depending on a work place or a function of the image processing apparatus and there are two image processing apparatuses is described in the present exemplary embodiment, the number of image processing apparatuses is not particularly limited and can also be one or three or more. Further, while the present exemplary embodiment is described with reference to the image processing apparatus 103, and the image processing apparatus 104 is used when a process is necessary with respect to an apparatus different from the image processing apparatus 103, the disclosure is not intended to limit other configurations.

The network 105 is a communication network for connecting apparatuses constituting the system, and the network 105 includes the Internet, a local area network (LAN), a wide area network (WAN), a dedicated digital line, and a combination thereof. The network 105 can be any wired or wireless network that enables data transmission/reception between the apparatuses included in the system.

<<Hardware Configuration of Client Terminal 101 and Document Management Server 102>>

FIG. 2 is a block diagram illustrating a hardware configuration of the client terminal 101 and the document management server 102 according to an exemplary embodiment.

A central processing unit (CPU) 202 controls the entire apparatus. The CPU 202 executes an application program stored in a hard disk drive (HDD) 205 and an operating system (OS), and performs control to temporarily store information and a file necessary for execution of the program in a random access memory (RAM) 203. The HDD 205 functions as a large-capacity memory and stores an application program such as an office application and a web browser, an OS, and a related program.

The RAM 203 functions as a main memory and a work area of the CPU 202. A read-only memory (ROM) 204 stores various types of data such as an input/output (I/O) program.

A display 206 is configured to display a command input via a keyboard/mouse 207 and a screen for various types of processing. An interface (I/F) 208 is an I/F for connecting with an external apparatus such as a printer, a universal serial bus (USB) device, and a peripheral device.

A system bus 201 handles a data flow in the apparatus. A network interface card (NIC) 209 exchanges data with an external apparatus via the network 105. The above-described computer configuration is an example and is not limited to the configuration example illustrated in FIG. 2. For example, the storage destination of the data or the program can be changed to the ROM 204, the RAM 203, or the HDD 205 depending on a feature of the data or the program. Unless otherwise specified, the program stored in the ROM 204 is loaded into the RAM 203 and the like and executed by the CPU 202 to implement various types of processing.

<<Hardware Configuration of Image Processing Apparatus>>

FIG. 3 is a block diagram illustrating an example of a hardware configuration of the image processing apparatuses 103 and 104. The hardware configuration of the image processing apparatus 103 will be described as an example below.

A control unit 310 including a CPU 311 controls an operation of the entire image processing apparatus 103. The CPU 311 reads a control program stored in a storage medium such as a ROM 312 and a HDD 314 and executes the control program to perform various types of control such as scanner reading control and data transmission control. A RAM 313 is a main memory of the CPU 311 and is used as a temporary storage area such as a work area. The HDD 314 is a storage medium configured to store image data, various programs, and various information tables.

An operation unit I/F 315 is an interface for connecting the control unit 310 with an operation unit 320. The operation unit 320 includes a liquid crystal display unit including a touch panel function, and a keyboard.

A printer I/F 316 is an interface for connecting the control unit 310 with a printer unit 321. Image data to be printed by the printer unit 321 is transferred from the control unit 310 via the printer I/F 316, and is printed on a recording medium by the printer unit 321. A scanner I/F 317 is an interface for connecting the control unit 310 with a scanner unit 322. The scanner unit 322 reads an image on a document and generates image data, and inputs the image data to the control unit 310 via the scanner I/F 317. A modem I/F 318 is an interface for connecting the control unit 310 with a modem unit 323. The modem unit 323 connects the control unit 310 to the public line 106. The modem unit 323 transmits/receives a fax to/from an external fax apparatus using the public line 106.

A network I/F 319 is an interface for connecting the control unit 310 to the network 105 such as a LAN. The network I/F 319 transmits and receives image data and various types of information to and from another apparatus (e.g., the client terminal 101) on the network 105.

<<Software Configuration>>

FIG. 4 is a block diagram illustrating a software configuration of the client terminal 101, the document management server 102, and the image processing apparatus 103 (104).

The client terminal 101 includes a document management application 401 and the HDD 205 (not illustrated in FIG. 4) that stores the document management application 401. The document management application 401 is an application program installed in the client terminal 101, and cooperates with a document management server application 411 to access document data in the document management server 102. The document management application 401 can perform various operations on the document data in the document management server 102 in response to a user request.

The document management application 401 includes a user interface (UI) unit 402, a processing execution unit 403, a setting information management unit 404, and a data communication control unit 405. The UI unit 402 constructs a user interface of the client terminal 101, and instructs the processing execution unit 403 to receive various user-input operations and execute a process corresponding thereto. The processing execution unit 403 executes various operations, such as viewing, searching, moving, and copying of document data in response to an instruction from the UI unit 402.

The setting information management unit 404 manages information necessary for setting up the document management application 401. In the present exemplary embodiment, the setting information management unit 404 is used to hold processing button information. A processing button is a UI for executing a specific process on document data. A processing button for executing a single process is referred to as a "single processing button" whereas a processing button for executing a plurality of processes is referred to as a "batch processing button". As used herein, the process is characterized by processing content and setting content. The processing content refers to a processing type such as printing, fax transmission, or folder move, whereas the setting content refers to a condition for executing the corresponding processing, such as the number of sheets to be printed, a fax transmission destination, and a move destination folder.

Information to be managed by the setting information management unit 404 is not limited to the information specified above. The data communication control unit 405 executes communication with the document management server 102 and the image processing apparatus 103 based on an instruction from the processing execution unit 403.

The document management server 102 includes the document management server application 411 and the HDD 205 (not illustrated in FIG. 4) that stores the document management server application 411.

The document management server application 411 is an application program configured to register and provide document data in response to a request from the document management application 401 of the client terminal 101.

The document management server application 411 includes a document database 412, a data management unit 413, and a data communication control unit 414. The document database 412 manages document data and attribute information for identifying the document data. The data management unit 413 inputs and outputs the document data and the attribute information to and from the document database 412 and searches for the document data and the attribute information in response to an instruction from the data communication control unit 414. The data communication control unit 414 instructs the data management unit 413 to process the document data in response to a request from the document management application 401.

The image processing apparatus 103 includes a fax transmission processing unit 421, a printing processing unit 422, a processing control unit 423, and a data communication control unit 424. The CPU 311 reads a software module stored in the HDD 314 and executes the software module to implement each function of the image processing apparatus 103.

If the fax transmission processing unit 421 receives a fax transmission request from the client terminal 101 via the processing control unit 423, the fax transmission processing unit 421 transmits a fax using fax document data received together with the fax transmission request. If the printing processing unit 422 receives a print request from the client terminal 101 via the processing control unit 423, the printing processing unit 422 executes printing processing using print document data received together with the print request.

The processing control unit 423 transmits a processing request and processing target document data received by the data communication control unit 424 to an appropriate processing unit. Herein, the appropriate processing unit refers to the fax transmission processing unit 421 and the printing processing unit 422 as described above as an example.

The data communication control unit 424 receives a fax transmission request or a print request from the client terminal 101 via the network I/F 319 and transmits the request to the processing control unit 423. The data communication control unit 424 also returns a processing result of the processing control unit 423 to the client terminal 101.

<<User Interface of Document Management Application>>

Figure 5A:
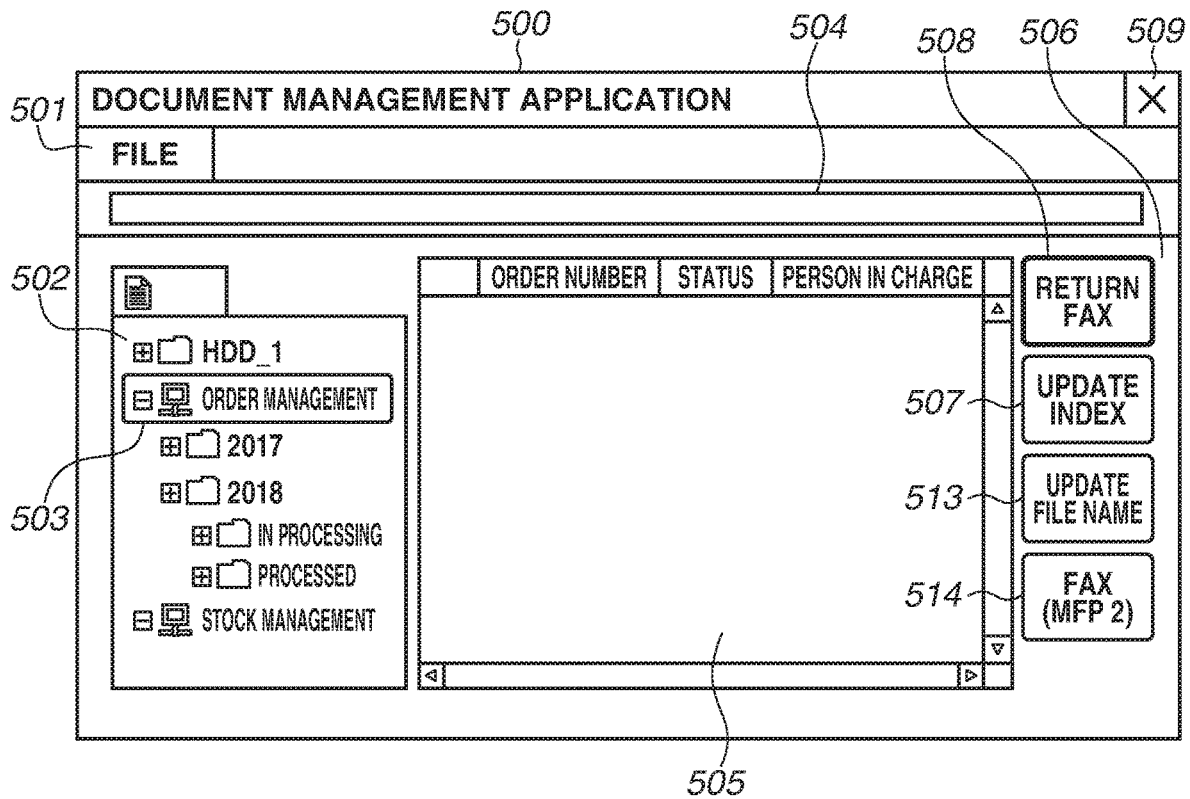
FIGS. 5A and 5B are diagrams illustrating a main screen displayed on the client apparatus and a menu list.
Figure 5B:
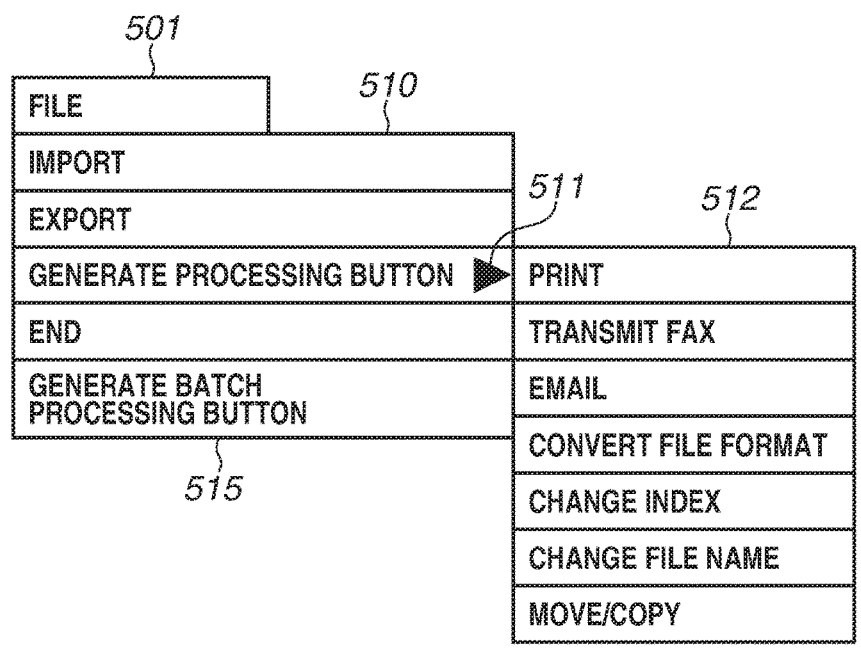

FIGS. 5A and 5B are diagrams illustrating an example of a home screen 500 displayed by the document management application 401 of the client terminal 101. Unless otherwise specified, the UI unit 402 receives user input, and the processing execution unit 403 executes an instruction from the UI unit 402 to implement an operation of the home screen 500.

A menu 501 is a functional menu configured to provide a function of the document management application 401. By selecting the menu 501 using the keyboard/mouse 207, a list of executable functions is displayed. In the present exemplary embodiment, a file operation is specified as an example of the function of the menu 501.

FIG. 5B illustrates an example of an operation menu displayed in a case where the file operation of the menu 501 is selected. The user can execute a desired operation by pressing an operation menu included in an operation menu list 510. In a case where there is a lower-hierarchical operation menu, a sign 511 is displayed within the operation menu. If the operation menu in which the sign 511 is displayed is selected, a lower-hierarchical operation menu list 512 is displayed. The maximum number of hierarchies in the hierarchy expansion is not particularly limited.

In the present exemplary embodiment, "Import", "Export", "Generate Processing Button", and "End" menus are displayed on the operation menu list 510. The sign 511 is displayed on the "Generate Processing Button" menu, and if the sign 511 is pressed, the lower-hierarchical operation menu list 512 is displayed. The "Generate Processing Button" menu is an operation menu for generating a processing button, and the operation menu list 512 displays a list of processing types of respective processing buttons. If any of the processing types is selected, a dialog for generating the corresponding processing button is displayed, and a process of generating the processing button is started. As used herein, the processing type refers to the processing content such as printing, fax transmission, or folder move.

Referring back to FIG. 5A, a navigation pane 502 is a region for navigating access to the document management server 102 managed by the document management application 401. More specifically, various servers managed by the document management application 401 and folders managed by the various servers are displayed. The folders displayed on the navigation pane 502 are further displayed based on a hierarchical configuration of the folders.

On the navigation pane 502, a list of connection destinations that are accessible by the document management application 401, such as the HDD 205 of the client terminal 101 and a shared folder on the network in addition to the document management server 102, is displayed.

In the present exemplary embodiment, an order management 503 corresponds to the document management server 102. If the order management 503 is selected, document information and folders stored under the order management 503 are displayed on a pane 505. The pane 505 displays a list of document information about document data stored in the connection destination designated on the navigation pane 502. The document information includes an identifier (ID) for uniquely specifying the document data in the document database 412, a storage location of the document data, and an index that represents a feature of the document data.

While the pane 505 can be configured to display a preview of the document data or to allow the document data to be edited, the pane 505 is configured to only display the document information in the present exemplary embodiment. The configuration of the pane 505 is limited to the display of the document information for the following reason. Each of the processes (e.g. fax transmission, file name update) described as an example in the present exemplary embodiment is a process to be performed after editing of the document data is completed. Thus, the user may want to change the name of the document data or externally transmit the document data but is less likely to want to edit the content of the document data. Thus, the pane 505 according to the present exemplary embodiment is configured to only display the document information based on an assumption that the user does not want to edit the content of the document data.

If the connection destination of the document management application 401 and the folder storing the connection destination are selected on the navigation pane 502, an address bar 504 displays path information about the selected folder. For example, if the order management 503 and a folder "2018" located under the order management 503 are selected on the navigation pane 502, the address bar 504 displays path information "http://xxx.xx.xx.xx/order management/2018".

If document information listed on the pane 505 as a result of selecting the folder "2018" is selected, path information about the document data specified by the document information is displayed on the address bar 504. In a case where the connection destination selected on the navigation pane 502 does not have a hierarchical configuration, a display unit (e.g. title) of the document data can be displayed on the address bar 504.

An output pane 506 is a region for displaying a single processing button 507 for executing a process on the document data selected on the pane 505. The output pane 506 can display a plurality of processing buttons. Each of the processing buttons is a UI (button) for executing a single process, and examples thereof include "Index Update" and "File Name Update".

Further, the processing button can be not only a button for executing a single process but also a button for executing a plurality of processes with a predetermined sequential order, and examples thereof include a "Return Fax" 508.

The processing button for executing the single process is referred to as the "single processing button" (507, 513, 514), whereas the processing button for executing the plurality of processes is referred to as the "batch processing button" (508).

While the number of processing buttons to be displayed on the output pane 506 is limited to four in the present exemplary embodiment, the number of processing buttons to be displayed is not limited to four. In a case where it is not possible to display all the processing buttons on the output pane 506, a scroll bar can be provided to display the processing buttons that are not displayed on the output pane 506.

Figure 12:
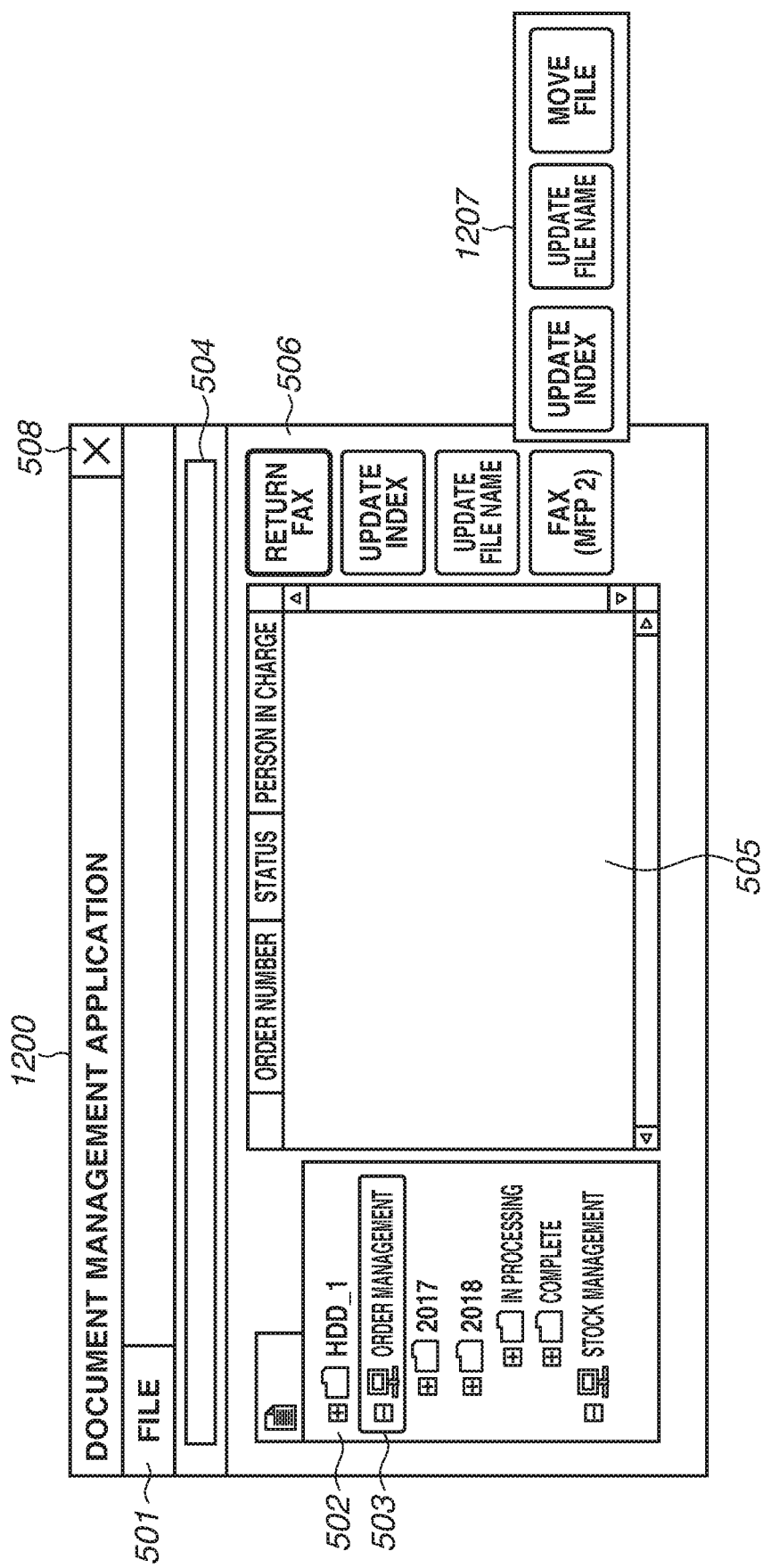
FIG. 12 is a diagram illustrating an example of a main screen displayed on the client apparatus.

A display form of the batch processing button 508 is not limited to the form illustrated in FIG. 5A. The batch processing button 508 can also be displayed so as to be distinguishable from the single processing button 507. Alternatively, content of the plurality of processes included in the batch processing button 508 can be displayed near the batch processing button 508 so as to allow the user to recognize the content at a press of the batch processing button 508. For example, when a pointer is placed over the batch processing button 508 by a mouse operation, a pop-up indicating the plurality of processes corresponding to the batch processing button 508 over which the pointer is placed can be displayed. A pop-up 1207 in FIG. 12 is an example of the pop-up displayed on the screen in this case.

If document information is selected on the pane 505 and a processing button displayed on the output pane 506 is pressed, a single process or a plurality of processes corresponding to the pressed processing button is executed on the document data.

The processing content to be executed on the document data or the document information corresponds to the processing type displayed on the operation menu list 512. Further, while the corresponding process is executed at a press of the processing button in the present exemplary embodiment, the process can also be executed by, for example, dragging and dropping the document information selected on the pane 505 on the single processing button 507, 513, or 514 or the batch processing button 508.

If a close button 509 is pressed, the home screen 500 is closed, and the document management application 401 is ended.

<<Dialog for Generating Processing Button>>

FIG. 6 is a block diagram illustrating a dialog 600 that is a user interface for generating a processing button. The single processing button 507 will be discussed as the processing button to be generated on the dialog 600.

Unless otherwise specified, the UI unit 402 receives user input, and the processing execution unit 403 executes an instruction from the UI unit 402 to implement an operation of the dialog 600. Further, the dialog 600 is displayed if any of the processing types of the operation menu list 512 is selected. A case where the processing type of "Transmit Fax" is selected will be described below.

A processing button name 601 is a region for inputting a name to be assigned to the single processing button 507. In the case of the single processing button 514, the name "Fax (MFP2)" can be created and edited on the processing button name 601.

A setting item display area 602 displays a setting item corresponding to the processing type selected on the operation menu list 512. The setting item to be displayed on the setting item display area 602 differs depending on the processing type selected on the operation menu list 512. Since the processing type "Transmit Fax" is selected on the operation menu list 512, the setting items "Transmission Fax Device Name" and "Transmission Method" are displayed.

The setting item corresponding to each of the processing types is managed by a table such as Table A. Table A includes the "Processing Type" and the corresponding "Setting Item List". In Table A, the "Processing Type" corresponds to the content of the operation menu list 512 (FIG. 5B), and the "Setting Item List" corresponds to the setting item(s) displayed on the setting item display area 602 of the dialog 600. Each name in parentheses in the "Setting Item List" is the name of a tag to be specified in processing button information that is generated at a press of an OK button 605 (FIG. 6).

TABLE A

| Processing Type | Setting Item List |
| --- | --- |
| Print | Printer Name (PrintName), Output Sheet Size (PrintParam.PaperSize), N-up (PrintParam.Nup), Expansion/Reduction (PrintParam.Expansion), Color Mode (PrintParam.Color) |
| Transmit Fax | Transmission Fax Device Name (FaxName), Transmission Method (FaxSentType) |
| Email | Attached File Format (AttachFileType) |
| Convert File Format | Destination File Format (FileTypeTo), Compression (Expansion), OCR (OCR), OCR Language (OCRLang) |
| Change Index | Target Library (LibraryName), Index (Index) |
| Change File Name | Naming Rule (Format) |
| Move/Copy | Target Library (LibraryName), Processing Mode (Mode), Operation Destination Path (FileTo) |

It is understood that the setting items "Transmission Fax Device Name" (603) and "Transmission Method" (604) described above as examples are included in the setting item list of the processing type "Transmit Fax" in Table A. Among the processing types other than the processing type "Transmit Fax", some processing types include three or more setting items, but not all the setting items always need to be displayed on the dialog 600. Only some of the setting items included in the setting item list on the dialog 600 can be displayed on the dialog 600.

The transmission fax device name 603 on the dialog 600 is the setting item for designating a fax device (e.g. image processing apparatus 103) to be used to transmit a fax. In the case discussed herein, a desired fax device is selected from a pull-down menu of a list of fax devices registered in advance in the client terminal 101. The method for fax device designation on the transmission fax device name 603 is not limited to the above-described method, and a fax device can also be designated by directly inputting the name of the fax device.

The transmission method 604 on the dialog 600 is the setting item for designating a transmission method for transmitting the document data designated on the pane 505 by fax. For example, in a case where a plurality of pieces of document information is selected on the pane 505, one of the transmission methods of "Separate Fax Transmission" and "Batch Transmission" is selectable on the transmission method 604. In the transmission method of "Separate Fax Transmission", pieces of document data that respectively correspond to the plurality of pieces of selected document information are transmitted to different destinations by fax. In the transmission method of "Batch Transmission", all the pieces of document data are transmitted to a single destination by fax.

A fax number designation method is not particularly limited and can be a method in which the user directly inputs a fax number to the image processing apparatus 103 at the time of executing a fax transmission, a method in which a fax number of the document data to be transmitted by fax is included in advance in the document information, or a method in which a fax number input field (not illustrated) is provided in the setting item display area 602.

The OK button 605 is a button for executing a process of generating a single processing button that reflects a setting value set on the dialog 600, and the dialog 600 is closed at a press of the OK button 605. If a cancel button 606 is pressed, the screen of the dialog 600 is closed without generating the single processing button 507, and the setting value set on the dialog 600 is discarded.

<<Single Processing Button Information>>

FIG. 7 is a diagram illustrating single processing button information 700 that is generated at the press of the OK button 605 and is stored in the setting information management unit 404 of the client terminal 101. While the single processing button information 700 is described in an Extensible Markup Language (XML) format in the present exemplary embodiment, any other format can also be used. A case of the single processing button information 700 for transmission by fax will be described below as an example with reference to FIG. 7.

An <OutputButton> tag 701 is a tag indicating a unit of single processing button information to be associated with one single processing button. More specifically, in the case of the single processing button information 700 corresponding to the one single processing button, there is only one <OutputButton> tag 701. The <OutputButton> tag 701 is configured to hold functionName information for identifying a processing type, and in the case discussed herein, the functionName information "Fax" indicating that the processing type is the fax transmission is described.

The <OutputButton> tag 701 includes an <ID> tag 702, a <DisplayName> tag 703, a <UserImageFilePath> tag 704, and an <Attributes> tag 705.

The <ID> tag 702 is a tag representing identification information for uniquely identifying the single processing button 514. The identification information is used in execution of a process using a program, and in the present exemplary embodiment, the ID "P-004" that identifies the single processing button 514 is described.

The <DisplayName> tag 703 is a tag configured to hold the button name input to the processing button name 601, and "Transmit Fax (MFP2)" is described as a setting value.

The <UserImageFilePath> tag 704 is a tag representing path information about an image file that specifies an appearance of the single processing button. How the single processing button appears when the single processing button is displayed on the output pane 506 is determined by designating the path information about the image file. The path information illustrated as an example is path information about the image file that is held in advance by the document management application 401, so that the user does not have to designate an image file. Alternatively, the user can be prompted to designate arbitrary path information on the dialog 600 to customize the image of the processing button.

The <Attributes> tag 705 includes the setting values set on the setting item display area 602 and the setting items corresponding to the setting values. The tags of the setting items refer to the tags (values in the parentheses in Table A) specified in the "Setting Item List" in Table A. In the case discussed herein, the fax transmission setting items, which are "Transmission Fax Device Name" (<FaxName>) and "Transmission Method" (<FaxSendType>), are described. The setting values "MFP-4000" and "Individually" are specified in the setting items. The setting value "MFP-4000" represents the fax device name selected by the user on the transmission fax device name 603. The setting value "Individually" represents the transmission method selected by the user on the transmission method 604. The setting values selectable on the transmission method 604 are "Individually" (separate fax transmission) and "Temporary" (batch fax transmission).

The single processing button information 700 is stored in a storage area such as the HDD 205, in a file format, and using each single processing button as a unit. However, the unit of storage is not limited to the above, and a plurality of single processing buttons can also be used as the unit of storage. In this case, the <OutputButton> tags 701 can be listed in parallel and included in a higher-level tag.

Table B is a list of the single processing button information 700 managed by the setting information management unit 404. The single processing button for which the single processing button information 700 is registered in Table B has already undergone and completed the process of button generation on the output pane 506.

TABLE B

| Processing Button ID | Processing Type | Display Name | Setting Value |
|---|---|---|---|
| P-001 | Print | Print (MFP 2) | PrintName = MFP-3000, PrintParam.Nup = 2up, PrintParam.Color = Color, PrintParam.Print = 2-Sided |
| P-002 | Print | Print (MFP 2) | PrintName = MFP-4000, PrintParam.Nup = 4up, PrintParam.Color = Mono, PrintParam.Print = 2-Sided |
| P-003 | Fax | Transmit Fax (MFP 1) | FaxName = MFP-3000, FaxSendType = Individually |
| P-004 | Fax | Transmit Fax (MFP 2) | FaxName = MFP-4000, FaxSendType = Individually |
| P-005 | UpdateProperty | Update Index (Change Person In Charge) | LibraryName = OrderManagement, Index = Charger: [Operator] |
| P-006 | UpdateProperty | Update Index (Complete) | LibraryName = OrderManagement, Index = Status: Complete, Index = LastUpdate: [Now] |
| P-007 | UpdateFileName | Update File Name (Complete) | Format = [Original]: [Now] |
| P-008 | MoveOrCopy | Move File (Complete) | LibraryName = OrderManagement, Mode = Move, PathTo = "2018/Complete" |
| P-009 | ChangeFileType | Convert into PDF | FileTypeTo = PDF, Compress = OFF, OCR = ON, OCRLang = Japanese |
| P-010 | MoveOrCopy | Copy File (Local) | LibraryName = HDD_1, Mode = Copy, PathTo = "Temporary" |
| P-011 | Mail | Email | AttachFileType = PDF |

Table B includes columns of "Processing Button ID", "Processing Type", "Display Name", and "Setting Value". The column of "Processing Button ID" represents an ID of the single processing button 507 set to the <ID> tag 702. The column of "Processing Type" represents the setting value of the functionName information of the <OutputButton> tag 701. The column of "Display Name" represents a value that indicates the display name of the single processing button set to the <DisplayName> tag 703. The column of "Setting Value" represents the setting items described in the <Attributes> tag 705 and the setting values corresponding to the setting items. The single processing button information 700 illustrated as an example in FIG. 7 corresponds to information specified by "P-004" in Table B.

<<Dialog for Generating Batch Processing Button>>

Figure 8:
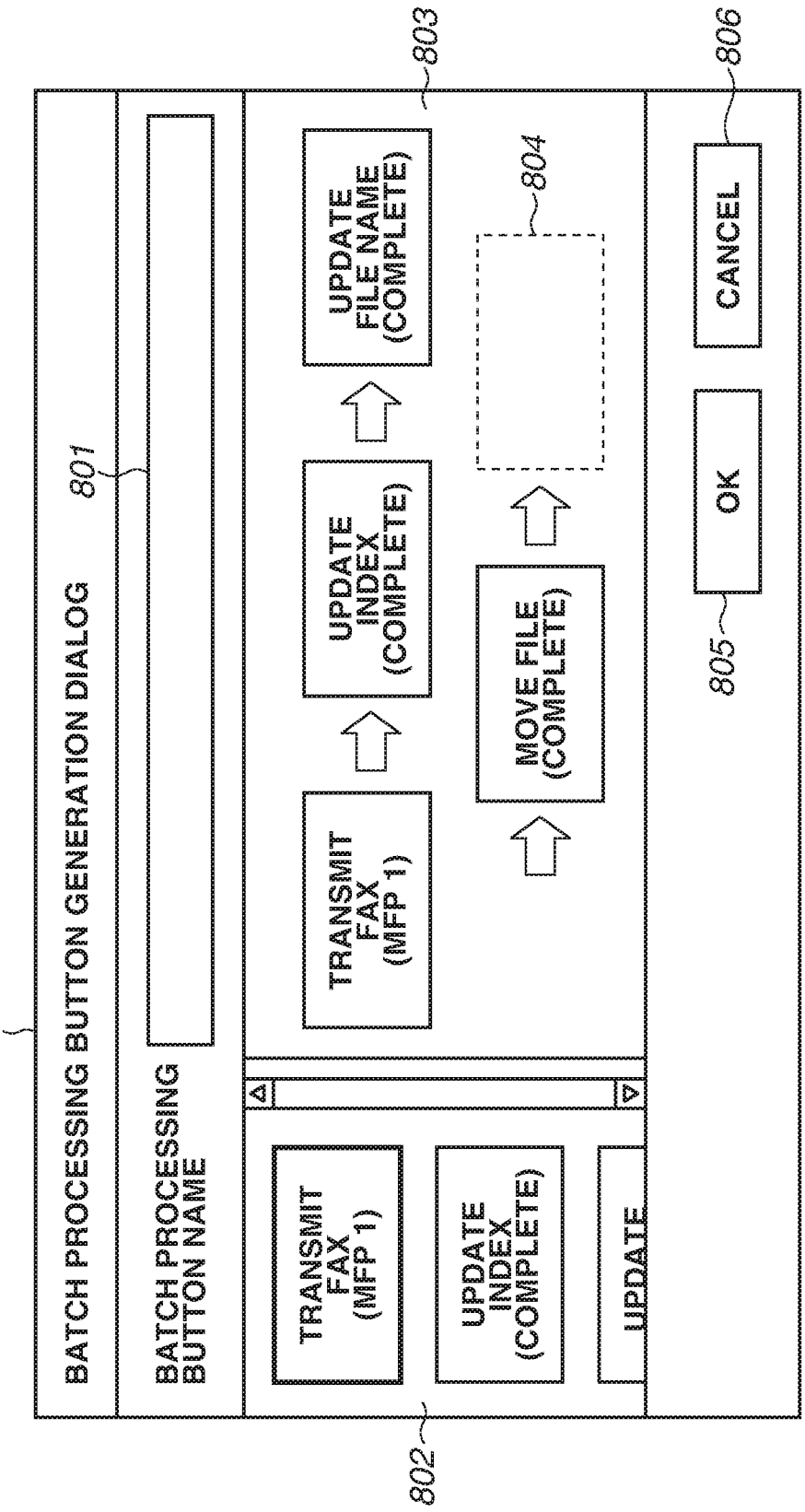
FIG. 8 is a diagram illustrating an example of a dialog for generating a batch processing button.

While the method of generating the single processing button is described above with reference to the dialog 600 in FIG. 6, FIG. 8 illustrates a dialog 800 for generating the batch processing button 508. The dialog 800 in FIG. 8 is displayed if an item "Generate Batch Processing Button" 515 of the operation menu list 510 in FIG. 5B is selected.

A batch processing button name 801 is a region for inputting a name of the button to be displayed when the batch processing button 508 is displayed.

A processing button list display pane 802 is a region for displaying a list of candidate single processing buttons to be included in the batch processing button 508. More specifically, the processing buttons including the single processing buttons that are generated via the dialog 600 are displayed on the processing button list display pane 802. In the case discussed herein, the single processing buttons displayed on the processing button list display pane 802 are displayed in a button format similar to the single processing buttons displayed on the output pane 506. In a case where there is a large number of single processing buttons, the user can vertically scroll the processing button list display pane 802 to search for a desired single processing button. However, in a case where the candidate single processing buttons are displayed on the processing button list display pane 802, the names of the processing buttons and checkboxes for selecting the processing buttons may be displayed instead of the button, and processing proceeds based on the user recognizing at least the names of the candidate single processing buttons.

A processing order generation pane 803 is a region for defining a sequential order of the processes using the single processing buttons displayed on the processing button list display pane 802. On the processing order generation pane 803, a single placement space 804 or a plurality of placement spaces 804 is displayed on the right hand side of the previously-added single processing button. The processing content and the sequential order of processes of the batch processing button 508 can be defined by dragging and dropping the single processing button displayed on the processing button list display pane 802 onto the placement space 804. The method of defining is not limited to the above-described method, and any method wherein a sequential order of the processes corresponding to the batch processing button is defined can be used. For example, the single processing button on the processing button list display pane 802 can be placed onto the placement space 804 by pressing the single processing button, or the single processing button can be added to a desired position in the sequential order by dragging and dropping the single processing button onto a desired position on the processing order generation pane 803. The upper limit of the single processing buttons that can be placed on the processing order generation pane 803 is not particularly limited herein.

An OK button 805 is a button for starting a process of generating the batch processing button 508 based on the batch processing button name 801 and the sequential order of the processes specified on the processing order generation pane 803. Batch processing button information containing the name set on the batch processing button name 801 and information about the single processing buttons placed on the processing order generation pane 803 is generated at a press of the OK button 805. The batch processing button information corresponds to the single processing button information 700 in the case of the single processing button.

A cancel button 806 is a button for cancelling the process of generating the batch processing button 508, and the setting value input to the dialog 800 is discarded. The dialog 800 is closed at a press of the OK button 805 or the cancel button 806.

<<Batch Processing Button Information>>

Figure 9A:
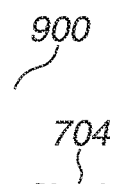
FIGS. 9A and 9B are diagrams illustrating an example of batch processing button information.

FIG. 9A illustrates batch processing button information 900 generated at a press of the OK button 805, and the batch processing button information 900 is managed by the setting information management unit 404 of the client terminal 101. The batch processing button information 900 illustrated as an example in the case discussed herein corresponds to the content illustrated as an example on the processing order generation pane 803 (FIG. 8). The batch processing button information 900 is described in the XML format but can also be described in another format. Each portion (e.g. a tag name and a description thereof) similar to that of the single processing button information 700 is given the same reference numeral, and a description thereof is omitted.

A <BatchProcessButton> tag 901 is a tag that represents a unit of the batch processing button information 900 of the batch processing button 508. The <BatchProcessButton> tag 901 includes the <ID> tag 702, the <DisplayName> tag 703, the <UserImageFilePath> tag 704, and a <StructuredProcess> tag 902.

In the <ID> tag 702, the identification information "BP-001" about the batch processing button 508 is described. In the <DisplayName> tag 703, the name "Return Fax" input to the batch processing button name 801 is described.

The <StructuredProcess> tag 902 is a tag for defining information about the single processing buttons designated on the processing order generation pane 803 and a sequential order of the single processing buttons. As it is only needed that the single processing buttons included in the batch processing button 508 can be identified by referring to the <StructuredProcess> tag 902, the <StructuredProcess> tag 902 contains at least the IDs (<ID> tag 702) of the single processing buttons and does not need to contain other redundant information (703 to 705).

A description order of the <OutputButton> tag 701 is the sequential order of the processes to be executed at a press of the batch processing button 508, and corresponds to the sequential order of the processes that is set on the processing order generation pane 803.

Table C is a list of the batch processing button information 900 generated on the dialog 800. The batch processing button for which the batch processing button information 900 is managed in Table C has already undergone and completed the process of button generation on the output pane 506. Table C is managed by the setting information management unit 404.

TABLE C

| Processing Button ID | Display Name | Execution Processing ID |
|---|---|---|
| BP-001 | Return Fax | P-003, P-006, P-007, P-008 |
| BP-002 | Return Mail | P-001, P-006, P-007, P-008 |
| BP-003 | Fax (General Purpose) | P-003, P-007 |

Table C includes columns of "Processing Button ID", "Display Name", and "Execution Processing ID". The column of "Processing Button ID" represents an ID set to the <ID> tag 702 of the batch processing button information 900.

The column of "Display Name" represents a value that indicates the display name of the processing button set to the <DisplayName> tag 703. The column of "Execution Processing ID" represents the IDs of the <ID> tags 702 included in the <StructuredProcess> tag 902.

<<Process Executed at a Press of Processing Button>>

Figure 10:
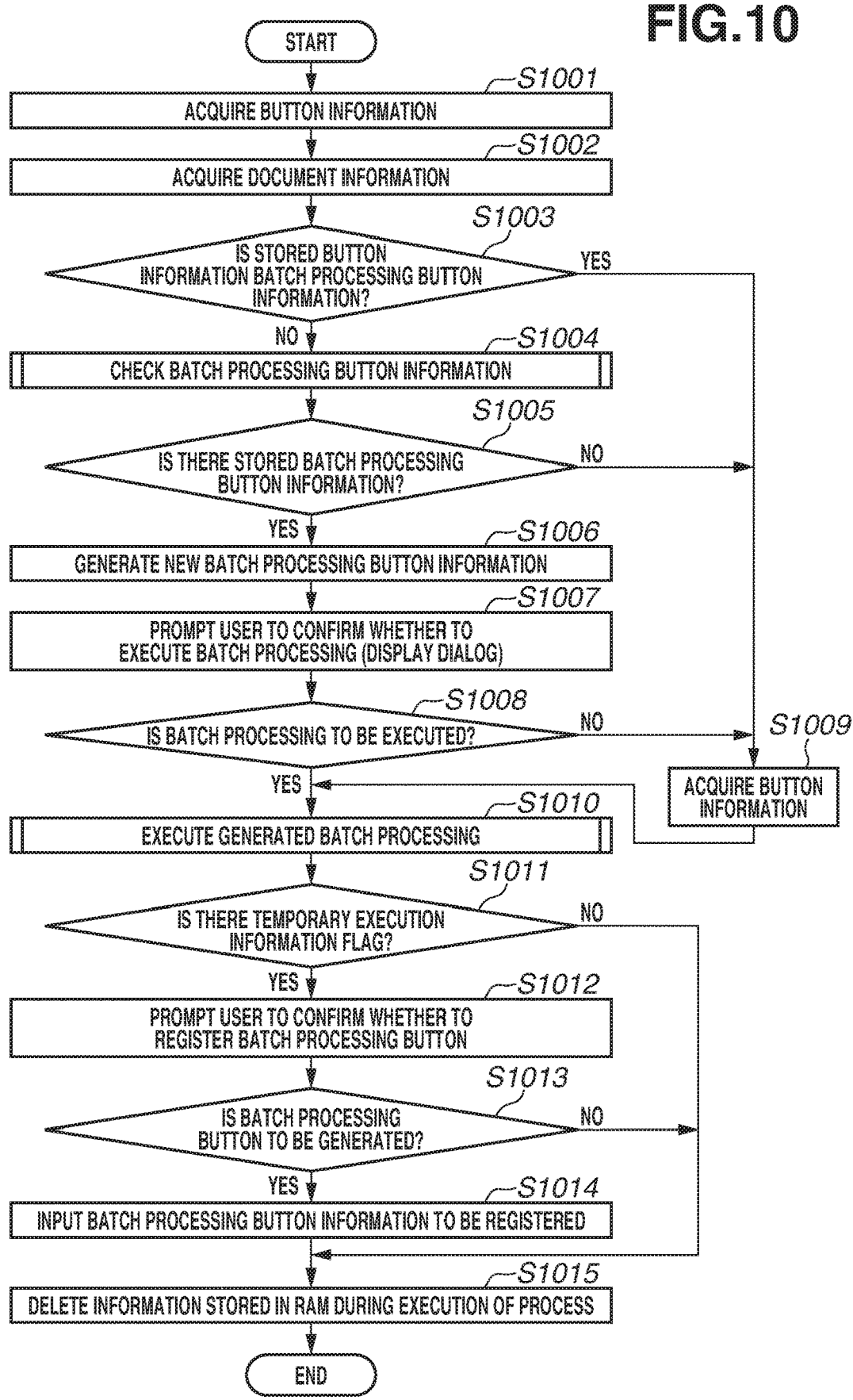
FIG. 10 is a flowchart illustrating a process performed in a case of executing a process corresponding to a processing button.

FIG. 10 is a flowchart illustrating a process that is executed at a press of the single processing button 507 or the batch processing button 508 placed on the output pane 506. The CPU 202 of a hardware configuration 200 of the client terminal 101 executes a control program stored in the HDD 205 to implement each step illustrated in FIG. 10. Further, the UI unit 402 identifies the processing button pressed by the user and notifies the processing execution unit 403 of the button information (700, 900) about the pressed processing button and processing target document information to start the process. Unless otherwise specified, the flowchart is executed by the processing execution unit 403.

In step S1001, the processing execution unit 403 identifies the processing button from the <ID> tag 702 of the button information acquired from the UI unit 402 using the button information (700, 900) managed by the setting information management unit 404, and acquires the single processing button information 700 or the batch processing button information 900. The acquired single processing button information 700 or the batch processing button information 900 is stored in the RAM 203 of the client terminal 101 for use in subsequent steps.

In step S1002, the processing execution unit 403 acquires the processing target document information from the UI unit 402 and stores the acquired information in the RAM 203 of the client terminal 101 for use in the subsequent steps.

In step S1003, the processing execution unit 403 determines whether the button information stored in the RAM 203 in step S1001 is the batch processing button information 900. In the present exemplary embodiment, the determination is performed based on whether the top tag of the button information described in XML is <BatchProcessButton> representing the batch processing button information 900. If the processing execution unit 403 determines that the stored button information is the batch processing button information 900 (YES in step S1003), the processing proceeds to step S1009. On the other hand, if the processing execution unit 403 determines that the stored button information is not the batch processing button information 900 (i.e., the stored button information is the single processing button information 700) (NO in step S1003), the processing proceeds to step S1004. In the case discussed herein, the single processing button 514 (Fax (MFP2)) is pressed in step S1001.

In the case where the processing execution unit 403 determines that the stored button information is not the batch processing button information 900 (NO in step S1003), the processing proceeds to step S1004. In step S1004, the processing execution unit 403 cross-checks the single processing button information 700 acquired in step S1001 with the batch processing buttons managed by Table C, and checks whether there is replaceable batch processing button information 900. More specifically, the processing execution unit 403 checks whether there is batch processing button information that includes single processing button information of the same processing type as the single processing button information acquired in step S1001. If there is the replaceable batch processing button information 900, the batch processing button information 900 is stored in the RAM 203, and the processing proceeds to step S1005. In step S1004, if there is a plurality of pieces of batch processing button information 900, the plurality of pieces of batch processing button information 900 is stored in the RAM 203.

In the case discussed herein, the processing type of the single processing button 514 pressed in step S1001 is "Fax" according to the tag 701 of the single processing button information 700. With reference to Tables B and C, the batch processing buttons that contain the single processing button of the processing type of "Fax" are "BP-001" and "BP-003". In step S1004, the batch processing button information about the batch processing buttons "BP-001" and "BP-003" is stored in the RAM 203.

In step S1005, the processing execution unit 403 determines whether there is batch processing button information 900 stored in the RAM 203 in step S1004. If the processing execution unit 403 determines that there is batch processing button information 900 stored in the RAM 203 in step S1004 (YES in step S1005), the processing proceeds to step S1006. On the other hand, if the processing execution unit 403 determines that there is no batch processing button information 900 stored in the RAM 203 in step S1004 (NO in step S1005), the processing proceeds to step S1009.

In step S1006, a portion of the <OutputButton> tag 701 included in the single piece of batch processing button information 900 or the plurality of pieces of batch processing button information 900 stored in the RAM 203 that matches the <OutputButton> tag 701 of the single processing button information 700 acquired in step S1001 is replaced with the single processing button information acquired in step S1001, so as to generate new batch processing button information 903.

Figure 9B:

More specifically, a portion of the batch processing button information 900 that is surrounded by <OutputButtonfunctionName="Fax"> and </OutputButton> is changed using the single processing button information 700. The new generated batch processing button information 903 is illustrated in FIG. 9B. From a comparison between the batch processing button information 900 and the batch processing button information 903, it is understood that the ID of <OutputButtonfunctionName="Fax"> is replaced with the ID of the single processing button information 700. In the case where there is the plurality of pieces of batch processing button information 900 acquired in step S1004, a plurality of pieces of batch processing button information 903 is generated.

FIG. 9B illustrates the batch processing button information 903 generated based on the batch processing button information 900 about the batch processing button "BP-001" among the new batch processing button information 903 generated in step S1006.

The batch processing button information 900 stored in the RAM 203 is updated using the new batch processing button information 903. At this time, a temporary execution information flag (not illustrated) indicating that the batch processing button information has been updated is stored in the RAM 203.

Figure 11:
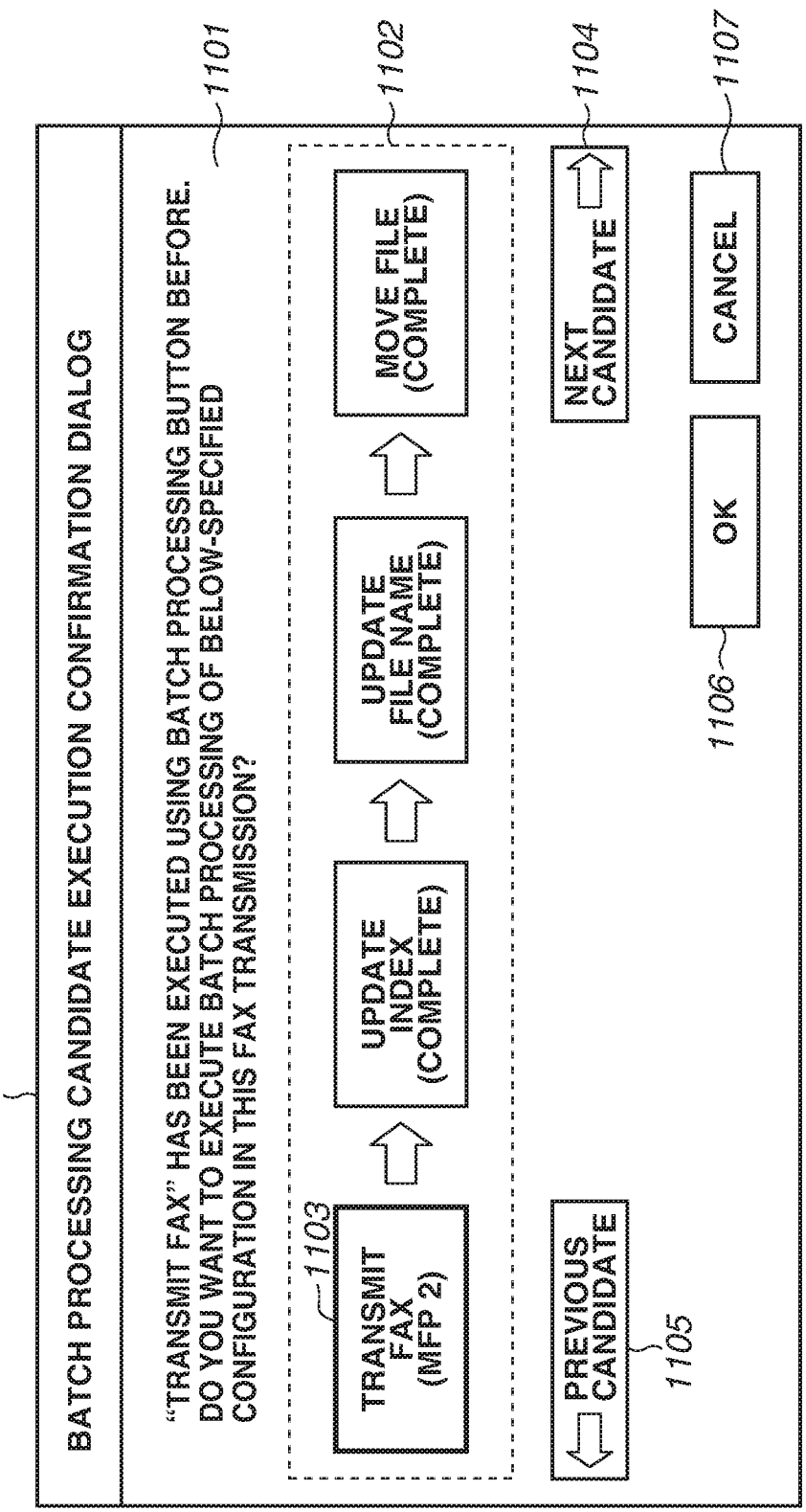
FIG. 11 is a diagram illustrating a dialog that displays a replaceable batch processing button.

In step S1007, the processing execution unit 403 transmits the batch processing button information 903 updated in step S1006 to the UI unit 402, and requests the UI unit 402 to display an execution confirmation dialog 1100 (FIG. 11). The UI unit 402 displays the execution confirmation dialog 1100 illustrated in FIG. 11 based on the batch processing button information 903 and presents a replaceable batch process to the user.

<<Execution Confirmation Dialog>>

FIG. 11 illustrates an example of the execution confirmation dialog 1100 on which the batch processing button including the user-selected single processing button is presented as a candidate process to be executed.

A message 1101 is a message that indicates a purpose of displaying the execution confirmation dialog 1100.

A batch processing information display section 1102 is a region for displaying a plurality of pieces of processing content using the batch processing button information 903 generated in step S1006. More specifically, the <OutputButton> tag 701 held in the <StructuredProcess> tag 902 in the batch processing button information 903 generated in step S1006 is sequentially displayed from the left. The information that is actually displayed on the execution confirmation dialog 1100 is the "Display Name" identified based on the ID held in the <OutputButton> tag 701 and Table B.

Among the single processing buttons displayed on the batch processing information display section 1102, a single processing button 1103 that is pressed by the user in step S1001 is highlighted. The user-selected single processing button is highlighted so that the user can recognize the presence and sequential order of the batch processing button that includes the single processing button of the same processing type as the single processing button selected on the output pane 506. It is understood from FIG. 11 that in the case discussed herein, the user-selected single processing button "Transmit Fax (MFP2)" is arranged at the top of the single processing buttons within the batch processing button displayed on the execution confirmation dialog 1100. A positional relationship between the process corresponding to the user-selected single processing button and the process corresponding to the batch processing button is not particularly limited, and the user-selected single processing button can also be arranged not at the top.

In a case where there is a plurality of candidate batch processing buttons to be executed, a next candidate button 1104 or a previous candidate button 1105 is enabled, display content of the batch processing information display section 1102 is switched at a press of the next candidate button 1104 or the previous candidate button 1105, and the user can check the plurality of candidate batch processing buttons. In the case discussed herein, the two batch processing buttons "BP-001" and "BP-003" are specified as candidates as described above in step S1004. In FIG. 11, the batch processing button information 903 generated based on the batch processing button "BP-001" is displayed, so that the batch processing button information (not illustrated) generated based on the batch processing button "BP-003" is displayed on the execution confirmation dialog 1100 at a press of the next candidate button 1104.

If an OK button 1106 is pressed, the series of processes are executed based on the processing content and the sequential order of the processes that are displayed on the batch processing information display section 1102. If a cancel button 1107 is pressed, since a press of the cancel button 1107 means the user denies execution of the batch processing indicated as a candidate to be executed, only the process corresponding to the single processing button pressed in step S1001 is executed.

More specifically, if the OK button 1106 is pressed in the state illustrated in FIG. 11, not the series of processes "Transmit Fax (MFP1)", "Update Index (Complete)", "Update File Name (Complete)", and "Move File (Complete)" corresponding to the batch processing button "BP-001" but the processes of "Transmit Fax (MFP2)", "Update Index (Complete)", "Update File Name (Complete)", and "Move File (Complete)" are executed. On the other hand, if the cancel button 1107 is pressed, only the process corresponding to the user-selected single processing button "Transmit Fax (MFP2)" is executed.

The execution confirmation dialog 1100 illustrated in FIG. 11 is displayed near the single processing button 514 pressed by the user on the output pane 506 on a home screen 500. The timing of the display of the execution confirmation dialog 1100 is the timing of the press of the single processing button 514 by the user and before execution of the process corresponding to the pressed single processing button 514.

The series of processes indicated on the execution confirmation dialog 1100 can be executed not only by pressing the OK button 1106 but also by clicking a predetermined area of a batch processing button information display section 1207. On the other hand, execution of the series of processes indicated on the execution confirmation dialog 1100 can be denied not only by pressing the cancel button 1107 but also by re-pressing the single processing button 514 pressed by the user in step S1001.

Referring back to FIG. 10, in step S1008, the processing execution unit 403 determines whether the batch processing is to be executed by determining whether the button pressed by the user on the execution confirmation dialog 1100 is the OK button 1106 or the cancel button 1107. If the processing execution unit 403 determines that the batch processing is to be executed (OK button 1106) (YES in step S1008), the processing proceeds to step S1010. On the other hand, if the processing execution unit 403 determines that the batch processing is not to be executed (cancel button 1107) (NO in step S1008), the processing proceeds to step S1009.

If the processing execution unit 403 determines that the processing button pressed by the user is the single processing button in step S1003, or if the processing execution unit 403 determines that there is no batch processing button information 900 in step S1005, or if the user presses the cancel button 806 in step S1008, in step S1009, the processing execution unit 403 acquires, from the RAM 203, the single processing button information 700 or the batch processing button information 900 about the single processing button pressed by the user. In the case where the single processing button information 700 is acquired, the XML format is converted, and the information is stored, in the RAM 203, as the batch processing button information 900 as a process to be executed. In the case where the batch processing button information 900 is acquired in step S1009, the batch processing button information 900 is stored in the RAM 203 without converting the information format. If a temporary execution information flag is stored in the RAM 203, the temporary execution information flag is deleted at this timing because it is determined that a new batch processing button does not need to be generated based on a result of processing in step S1003, S1005, or S1008.

In step S1010, the processing execution unit 403 executes processing on the document data stored in the RAM 203 using the batch processing button information 900 stored in the RAM 203. After the processing on the document data is ended, the processing proceeds to step S1011.

In step S1011, the processing execution unit 403 determines whether there is a temporary execution information flag in the RAM 203. If the processing execution unit 403 determines that there is the temporary execution information flag in the RAM 203 (YES in step S1011), the processing proceeds to step S1012. On the other hand, if the processing execution unit 403 determines that there is no temporary execution information flag in the RAM 203 (NO in step S1011), the processing proceeds to step S1015.

As described above, the temporary execution information flag is a flag indicating that the batch processing button information stored in the RAM 203 is updated by a user operation performed on the execution confirmation dialog 1100. Depending on whether the flag is present or absent, whether to generate a new batch processing button using the single processing button pressed by the user in step S1001 and the stored batch processing button is determined.

In step S1012, the processing execution unit 403 displays, via the UI unit 402, a dialog for confirming whether the batch processing button information 903 selected by the user in step S1007 is to be registered as the batch processing button 508. The dialog displayed in step S1012 has an ordinary configuration of the client terminal 101, so that a description of the dialog configuration is omitted. After the processing execution unit 403 receives, via the UI unit 402, information about whether the user accepts the registration on the dialog, the processing proceeds to step S1013.

In step S1013, if it is determined that the batch processing button is to be generated (YES in step S1013), the processing proceeds to step S1014. On the other hand, if it is determined that the batch processing button is not to be generated (YES in step S1013), the processing proceeds to step S1015.

In step S1014, the processing execution unit 403 prompts the user to customize the batch processing button information to be registered via the dialog 800. The batch processing button information 903 displayed on the dialog 800 at this time corresponds to the batch processing button information displayed on the execution confirmation dialog 1100. The processing in step S1014 allows the user to customize the batch processing button to be registered based on the processing content displayed on the execution confirmation dialog 1100.

Alternatively, the processing content presented on the execution confirmation dialog 1100 can be registered as a new batch processing button without displaying the dialog 800 and prompting the user to customize the information in step S1014. In this case, the name of the button is automatically given by the document management application 401.

In step S1015, after the OK button 805 on the dialog 800 is pressed in step S1014, all the information stored in the RAM 203 as a result of executing the flowchart is deleted, and the process is ended. The process illustrated in FIG. 10 is as described above.

<<Process of Confirming Batch Processing Button Information>>

Figure 13:
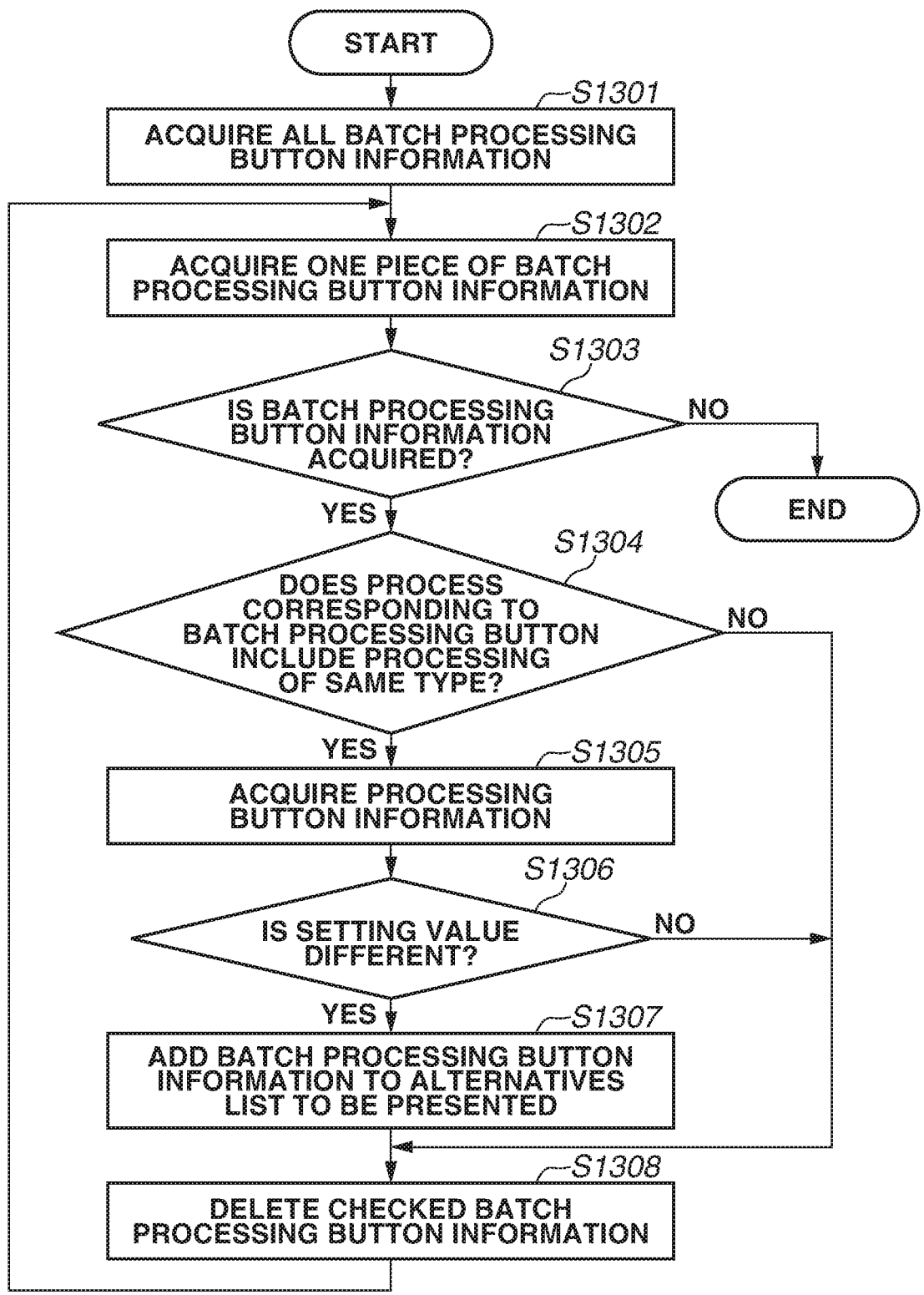
FIG. 13 is a flowchart illustrating a process of acquiring replaceable batch processing button information.

FIG. 13 is a flowchart illustrating the above-described processing of step S1004 in FIG. 10 in detail.

The flowchart illustrates a process for confirming whether the batch processing button includes the single processing button of the same processing type as the single processing button pressed by the user in step S1001. At the time of the start of the flowchart, the single processing button information 700 about the single processing button pressed by the user is stored in the RAM 203.

The CPU 202 of the client terminal 101 executes a control program stored in the HDD 205 to implement each step of the flowchart in FIG. 13. Unless otherwise specified, the flowchart is executed by the processing execution unit 403.

In step S1301, the processing execution unit 403 acquires all the batch processing button information 900 stored in the setting information management unit 404. The acquired batch processing button information 900 is stored in the RAM 203 in a list format.

In step S1302, the processing execution unit 403 acquires one piece of batch processing button information 900 from the processing execution list of the batch processing button information 900 stored in the RAM 203. In step S1303, if the processing execution unit 403 determines that the batch processing button information 900 is acquired (YES in step S1303), the processing proceeds to step S1304. On the other hand, if the processing execution unit 403 determines that the batch processing button information 900 is not acquired (NO in step S1303), the process is ended. The timing of the determination of whether there is batch processing button information does not have to be step S1302, and the determination can also be performed at the time of the storage in the RAM 203 in step S1301.

In step S1304, the processing execution unit 403 determines whether the process corresponding to the batch processing button includes a process of the same processing type as the single processing button 514 pressed by the user. More specifically, the <OutputButton> tag 701 described in the batch processing button information 900 acquired in step S1302 is extracted. Then, whether the functionName attribute of the extracted <OutputButton> tag 701 is the same as that of the <OutputButton> tag 701 of the single processing button information 700 corresponding to the single processing button 514 pressed by the user is checked. More specifically, the functionName attribute of the <OutputButton> tag 701 of the single processing button information 700 is "Fax", whereas the functionName attribute of the <OutputButton> tag 701 of the batch processing button information 900 is "Fax", "UpdateIndex", "UpdateFileName", and "MoveOrCopy". As a result of comparison of the button information (700, 900), it is determined that the functionName attribute of the batch processing button information 900 includes "Fax" that is the same as the functionName attribute of the single processing button information 700 in step S1304 (YES in step S1304), and the processing proceeds to step S1305. On the other hand, in step S1304, if it is determined that the same functionName attribute is not included (NO in step S1304), the processing proceeds to step S1308.

In step S1305, the processing execution unit 403 acquires the single processing button information 700 identified by the ID included in the <OutputButton> tag 701 of the batch processing button information 900 from the setting information management unit 404, and the processing proceeds to step S1306. In the case discussed herein, the batch processing button information 900 includes the IDs "P-003", "P-006", "P-007", and "P-008", so that the processing execution unit 403 acquires the corresponding single processing button information by referring to Table B.

In step S1306, the processing execution unit 403 refers to the information included in the <Attributes> tag of the single processing button information acquired in step S1305 and determines whether the information is different from the information included in the <Attributes> tag of the single processing button information 700. If the processing execution unit 403 determines that the information is different (YES in step S1306), the processing proceeds to step S1307. On the other hand, if the processing execution unit 403 determines that the information is not different (NO in step S1306), the processing proceeds to step S1308. In step S1307, the batch processing button information 900 acquired in step S1302 is added to an alternatives list stored in the RAM 203, and the processing proceeds to step S1308. The batch processing button information 900 added to the alternatives list is referred to at the time of the display of the execution confirmation dialog 1100 (step S1007).

The information included in the <Attributes> tag of the single processing button information 700 acquired in step S1305 corresponds to the "Setting Value" in Table B, and whether the information is the same as the setting value of the single processing button 514 pressed by the user is determined. The <Attributes> tag of the single processing button information 700 includes the setting item "FaxName" and the corresponding setting value "MFP-4000", and the setting item "FaxSendType" and the corresponding setting value "Individually". By referring to the "Setting Value" of the single processing button information acquired in step S1305, it is understood that the "Setting Value" matches the setting value of the setting item of the ID "P-004". Thus, in step S1306, the processing execution unit 403 determines that the information is not different (NO in step S1306), and the processing proceeds to step S1308.

If the processing execution unit 403 determines that the processing type is not the same in step S1304 or if the processing execution unit 403 determines that the setting value is different in step S1306, in step S1308, the processing execution unit 403 deletes the batch processing button information 900 acquired in step S1302 from the list stored in the RAM 203, and the processing returns to step S1302.

<<Process for Executing Process Corresponding to Batch Processing Button>>

Figure 14:
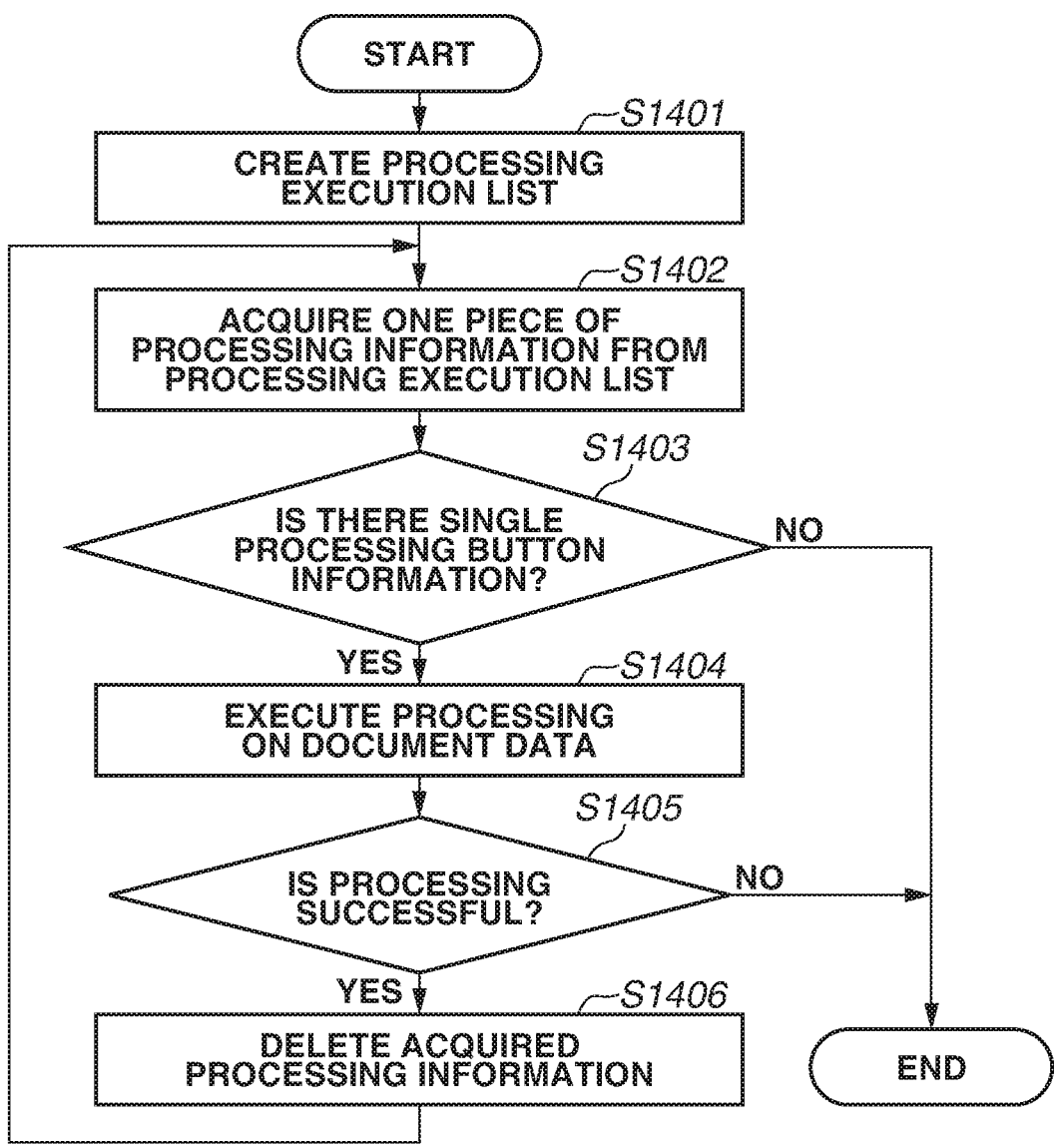
FIG. 14 is a flowchart illustrating a process of executing a process corresponding to a batch processing button.

FIG. 14 is a flowchart illustrating step S1010 in FIG. 10 in detail.

The flowchart illustrates a process for executing a process on document data based on the batch processing button information 900. Thus, the document data to be processed, document information about the document data, and the batch processing button information 900 determined to be executed are provided to the processing execution unit 403 at the time of the start of the flowchart.

The CPU 202 of the hardware configuration 200 of the client terminal 101 executes a control program stored in the HDD 205 to implement each step (operation) of the flowchart illustrated in FIG. 14. Unless otherwise specified, the flowchart is executed by the processing execution unit 403.

In step S1401, the processing execution unit 403 extracts the <OutputButton> tag 701 from the <StructuredProcess> tag 902 of the batch processing button information 900 in the sequential order described in the batch processing button information 900. The extracted <OutputButton> tag 701 is stored, in the RAM 203, in a list format and in the order of description. The list stored in this step is referred to as a processing execution list.

In step S1402, the processing execution unit 403 acquires a first piece of processing information included in the processing execution list stored in step S1401. In step S1403, the processing execution unit 403 acquires, from the setting information management unit 404, the single processing button information 700 that matches the setting value of the <ID> tag 702 of the acquired information, and stores the single processing button information 700 in the RAM 203. If there is no single processing button information 700 that matches the ID (NO in step S1403), the processing content included in the batch processing button cannot be identified, so that the process is ended.

On the other hand, if it is determined that there is the single processing button information 700 that matches the ID (YES in step S1403), in step S1404, the process corresponding to the single processing button information 700 stored in the RAM 203 is applied to the document data received at the time of the start of the flowchart.

More specifically, in step S1404, in a case where the single processing button information 700 is a process to be performed on the image processing apparatus 103, the document data, the <Attributes> tag, and the document information are transmitted from the data communication control unit 405 to the processing control unit 423 via the data communication control unit 424 to request the image processing apparatus 103 to execute processing. The processing control unit 423 causes the fax transmission processing unit 421 or the printing processing unit 422 to execute the processing, depending on the request content. If the processing is ended, a result is transmitted to the data communication control unit 405 of the document management application 401.

In a case where the single processing button information 700 is a process to be performed on the document management server 102, document data identification information and <Attributes> tag information are transmitted to the data communication control unit 405. The data communication control unit 405 requests the data management unit 413 to execute processing via the data communication control unit 414 of the document management server application 411. The data management unit 413 updates the information stored in the document database 412 based on the transmitted information, and returns a result of the update to the data communication control unit 405 of the document management application 401.

In step S1405, the processing execution unit 403 determines whether the processing on the document data is successful. If the result of the processing in step S1404 is successful (YES in step S1405), the processing proceeds to step S1406. On the other hand, if the processing execution unit 403 determines that the processing on the document data is not successful (NO in step S1405), the flowchart is ended.

In step S1406, the first piece of processing information acquired in step S1402 is deleted from the processing execution list. If erasing is completed, the processing returns to step S1402, and the process is executed based on different single processing button information 700. The process illustrated in FIG. 14 is as described above.

According to the present exemplary embodiment, in a case where there is the batch processing button including the user-selected single processing button, the process corresponding to the batch processing button is executable.

While the functionName attributes of all the <OutputButton> tags of the batch processing button information 900 acquired in step S1302 and the <OutputButton> tag of the single processing button information 700 received at the time of the start of the process are compared, and whether the <OutputButton> tags of the batch processing button information 900 include the same functionName attribute as that of the single processing button information 700 is determined in step S1304 in FIG. 13, the determination is not limited to that described above. Alternatively, whether the single processing button at the top of the batch processing button information 900 matches the single processing button pressed by the user can be determined.

As described above, information about the presence of the batch processing button including the same processing type as the single processing button 514 is provided to the user before the process corresponding to the single processing button 514 pressed by the user is executed, so that the series of user-desired processes is automatically executed without generating a new batch processing button in advance. More specifically, the series of processes is executable at a press of the single processing button 514 by the user, so that similar user operability to that in the case where the batch processing button is pressed can be achieved.

In the first exemplary embodiment, whether the batch processing button information includes the single processing button information of the same processing type is determined in step S1304 in FIG. 13. In a second exemplary embodiment, in addition to the processing type, history information is added as a determination condition to be satisfied for each processing type. The determination conditions are set to be stricter than that in the first exemplary embodiment so that a batch processing button that better satisfies the user demand is presented. In the present exemplary embodiment, each process that is already described above is given the same reference number, and a detailed description thereof is omitted.

In the second exemplary embodiment, an operation history of user operations on the processing buttons is added to the determination condition in step S1304 in addition to the processing type. Thus, the functional configuration of the client terminal 101 is changed as described below.

<<Software Configuration of Client Terminal 101>>

Figure 15:
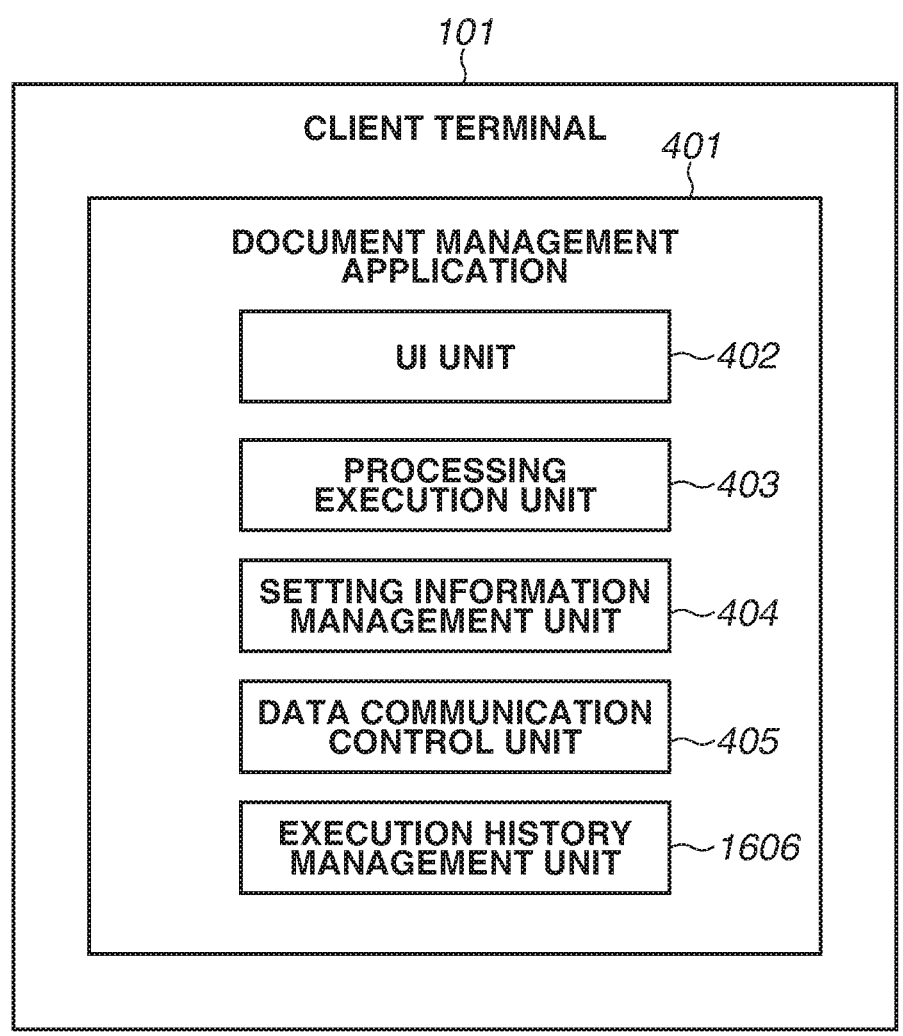
FIG. 15 is a block diagram illustrating a software configuration of the client terminal according to a second exemplary embodiment.

FIG. 15 is a block diagram illustrating a software configuration of the client terminal 101 according to the second exemplary embodiment. The software configuration is different from the software configuration according to the first exemplary embodiment in that the document management application 401 includes an execution history management unit 1606.

The execution history management unit 1606 is a function of managing, as history information, a process executed by a user operation on the output pane 506. Table D illustrates an example of the history information managed by the execution history management unit 1606. Table D includes "Processing Button ID", "Document Storage Library", which is a storage destination of document data to be processed, and "Execution Date", which is the date of execution of the process.

TABLE D

| Processing Button ID | Execution Date | Document Storage Library |
|---|---|---|
| BP-001 | 2018 May 9 | Order Management |
| BP-001 | 2018 May 13 | Order Management |
| BP-003 | 2018 May 16 | Stock Management |
| BP-002 | 2018 May 20 | Order Management |

<<Process for Storing History Information>>

Figure 16:
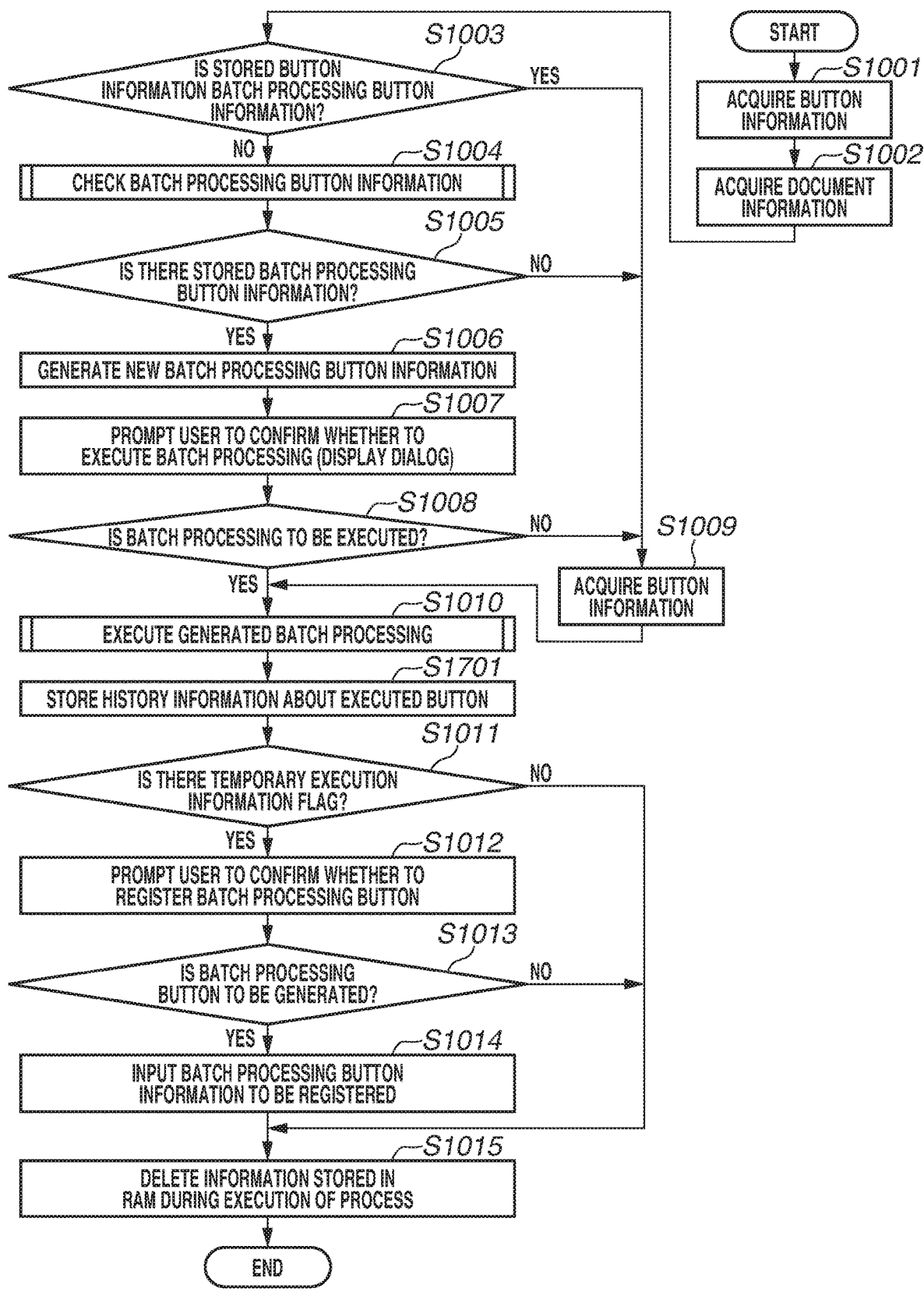
FIG. 16 is a flowchart illustrating a process performed in a case of executing a process corresponding to a processing button according to the second exemplary embodiment.

FIG. 16 illustrates a main flowchart to which a process for storing the history information is added according to the present exemplary embodiment. The flowchart is different from the flowchart in FIG. 10 in that in step S1701 after the process corresponding to the batch processing button or the single processing button is executed in step S1010, the processing execution unit 403 transmits a result of the execution to the execution history management unit 1606, and the execution history management unit 1606 manages the result as the history information. An example of the history information is as illustrated in Table D, and the single processing button information 700 or the batch processing button information 900 used in step S1010 and the document information received by the processing execution unit 403 at the time of the start of the process are recorded in association with each of the items included in Table D. After the history information is stored in step S1701, the processing proceeds to step S1011.

<<Process for Checking Whether There is Alternative Batch Processing Button>>

Figure 17:
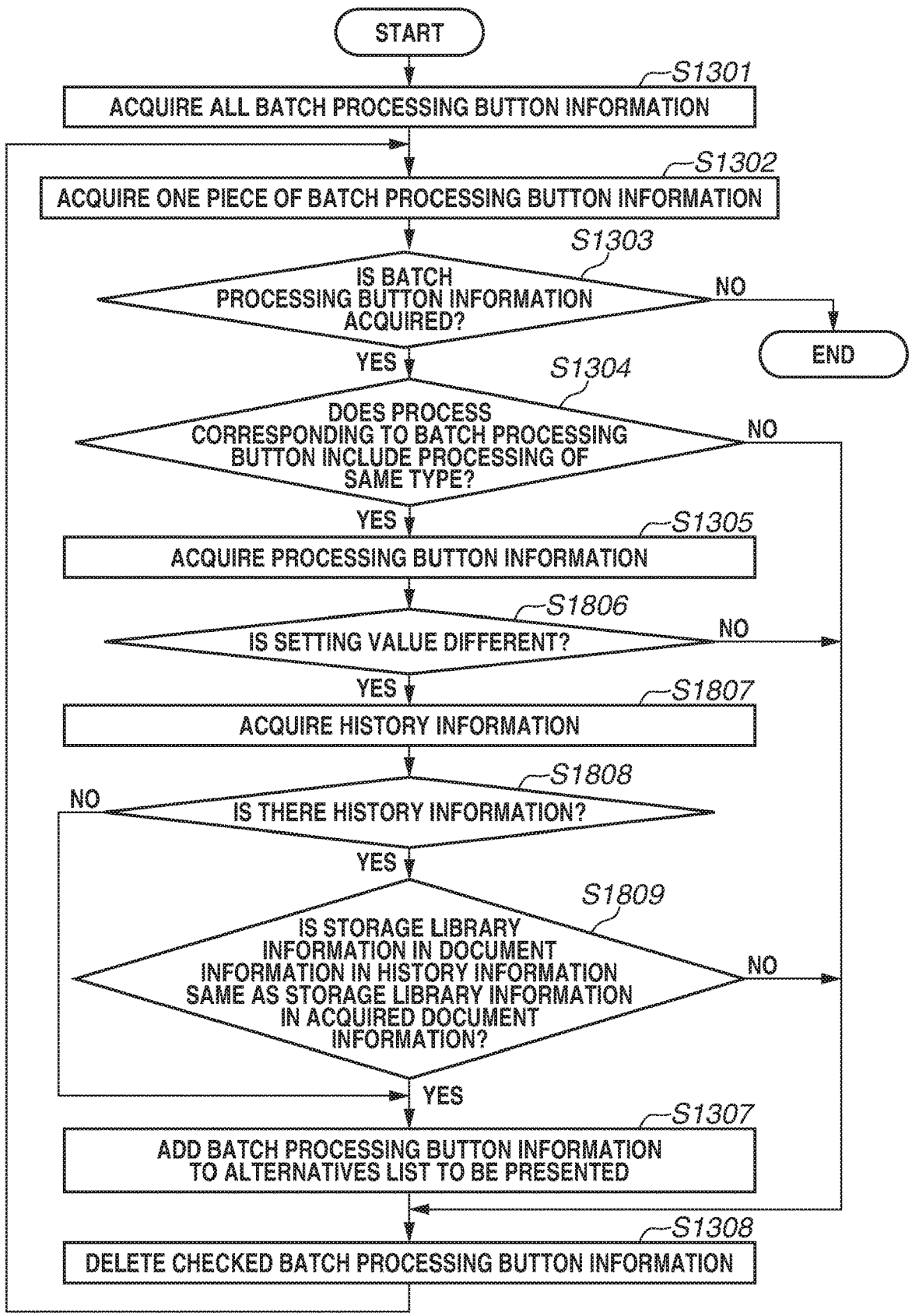
FIG. 17 is a flowchart illustrating a process of acquiring replaceable batch processing button information according to the second exemplary embodiment.

FIG. 17 is a flowchart illustrating a process for checking whether there is an alternative batch processing button that uses the history information in step S1004 in FIG. 16.

Only a step of the process that is different from the steps in FIGS. 13 and 15 will be described below using a new step number, and any step that is similar in processing content is given the same step number as in FIGS. 13 and 15 and a description thereof is omitted.

The flowchart is a process for checking whether there is batch processing button information 900 that can be replaced with the process corresponding to the single processing button information 700 pressed by the user. Thus, it is assumed that the user-pressed single processing button information 700 and the user-selected processing target document information are already stored in the RAM 203 at the time of the start of the flowchart.

The CPU 202 of the hardware configuration 200 of the client terminal 101 executes a control program stored in the HDD 205 to implement each step of the flowchart illustrated in FIG. 17. Unless otherwise specified, the flowchart is executed by the processing execution unit 403.

In step S1806, the processing execution unit 403 compares all the <Attributes> tags of the single processing button information 700 acquired in step S1305 with the <Attributes> tag of the single processing button information 700 received at the time of the start of the flowchart. Then, whether the below-described conditions are satisfied is checked.

Condition 1: The setting value of a comparison item illustrated in Table E below is the same.

Condition 2: The setting value of a setting item that is not included in Table E is different.

If the above-described two conditions are both satisfied (YES in step S1806), the processing proceeds to step S1807. On the other hand, if at least one of the two conditions is not satisfied (NO in step S1806), the processing proceeds to step S1308. In the first exemplary embodiment (step S1304, step S1306), if the processing type is the same and at least one setting value is different, the processing proceeds to the next step S1307.

TABLE E

| Processing Type | Comparison Item |
|---|---|
| Print | PrintParam |
| Fax | (N/A) |
| Email | (N/A) |
| Convert File Format | LibraryName |
| Update Index | LibraryName, Index |
| Update File Name | LibraryName, Format |
| Move/Copy | LibraryName, FileTo |

Table E defines, for each processing type, the setting item to be compared in step S1806, and is held in advance by the program. Alternatively, Table E can also be externally stored in, for example, the setting information management unit 404.

In step S1807, the processing execution unit 403 acquires, from the execution history management unit 1606, the latest history information in which the value of the <ID> tag of the batch processing button information 900 acquired in step S1302 matches the processing ID column in Table D. The acquired history information is stored in the RAM 203, and the processing proceeds to step S1808.

In step S1808, the processing execution unit 403 determines whether there is the history information acquired in step S1807 and stored in the RAM 203. If the processing execution unit 403 determines that there is the history information (YES in step S1808), the processing proceeds to step S1809. On the other hand, if the processing execution unit 403 determines that there is no history information (NO in step S1808), the processing proceeds to step S1307, and a process of adding the information to the alternatives list is performed.

In step S1809, after the processing execution unit 403 determines that there is the history information, the processing execution unit 403 compares storage library information included in the document information in the history information with storage library information included in the document information acquired at the time of the start of the flowchart. If the processing execution unit 403 determines that the former storage library information and the latter storage library information match (YES in step S1809), the processing proceeds to step S1307. On the other hand, if the processing execution unit 403 determines that the former storage library information and the latter storage library information do not match (NO in step S1809), the processing proceeds to step S1308 without adding the information to the alternatives list.

In the present exemplary embodiment, in a case where there is no history information to be a determination criterion in step S1809 (step S1808), it is not possible to determine whether the batch processing button information acquired in step S1302 is to be added to the alternatives list. Thus, in step S1307, a process of adding the information to the alternatives list is executed.

On the other hand, in a case where the processing execution unit 403 determines that there is the history information and that the storage library information of the history information is different from the storage library information of the document data, since the document data to be processed is different, the processing execution unit 403 determines that the user desires a process different from a previously-executed process, and the processing proceeds to step S1308 without executing step S1307.

According to the present exemplary embodiment, a batch processing button that better satisfies the user demand is presented by referring to the predetermined comparison item and the history information.

The process of referring to Table D in step S1806 and the process of referring to the history information in step S1809 do not have to be executed in the same flow and can also be executed as independent processes.

OTHER EMBODIMENTS

In the first exemplary embodiment, as a method of generating the batch processing button 508, the method in which the single processing button displayed on the processing button list display pane 802 is selected and arranged on the processing order generation pane 803 is described. Alternatively, a new batch processing button can be generated by combining the batch processing button with the single processing button. More specifically, a new batch processing button can be generated by selecting the single processing button or the batch processing button displayed on the processing button list display pane 802 and arranging the single processing button or the batch processing button on the processing order generation pane 803.

While whether the processing button pressed by the user is the batch processing button or the single processing button is determined and the processing content is changed based on the determination result in FIG. 10 in the first exemplary embodiment, the same process (steps S1004 to S1008) can be performed regardless of the type of the processing button.

In FIG. 10 in the first exemplary embodiment, whether to register the batch process presented on the execution confirmation dialog 1100 as a batch processing button is determined (step S1011 to S1014). Alternatively, the process in FIG. 10 can be ended without registering the batch process as the batch processing button. Yet alternatively, a predetermined threshold value can be set to the number of times of processing by the user before registration as the batch processing button, and the user may be prompted to register the batch processing button in steps S1011 to S1014 if the number of times the user executes steps S1001 to S1010 exceeds the threshold value.

Figure 18:
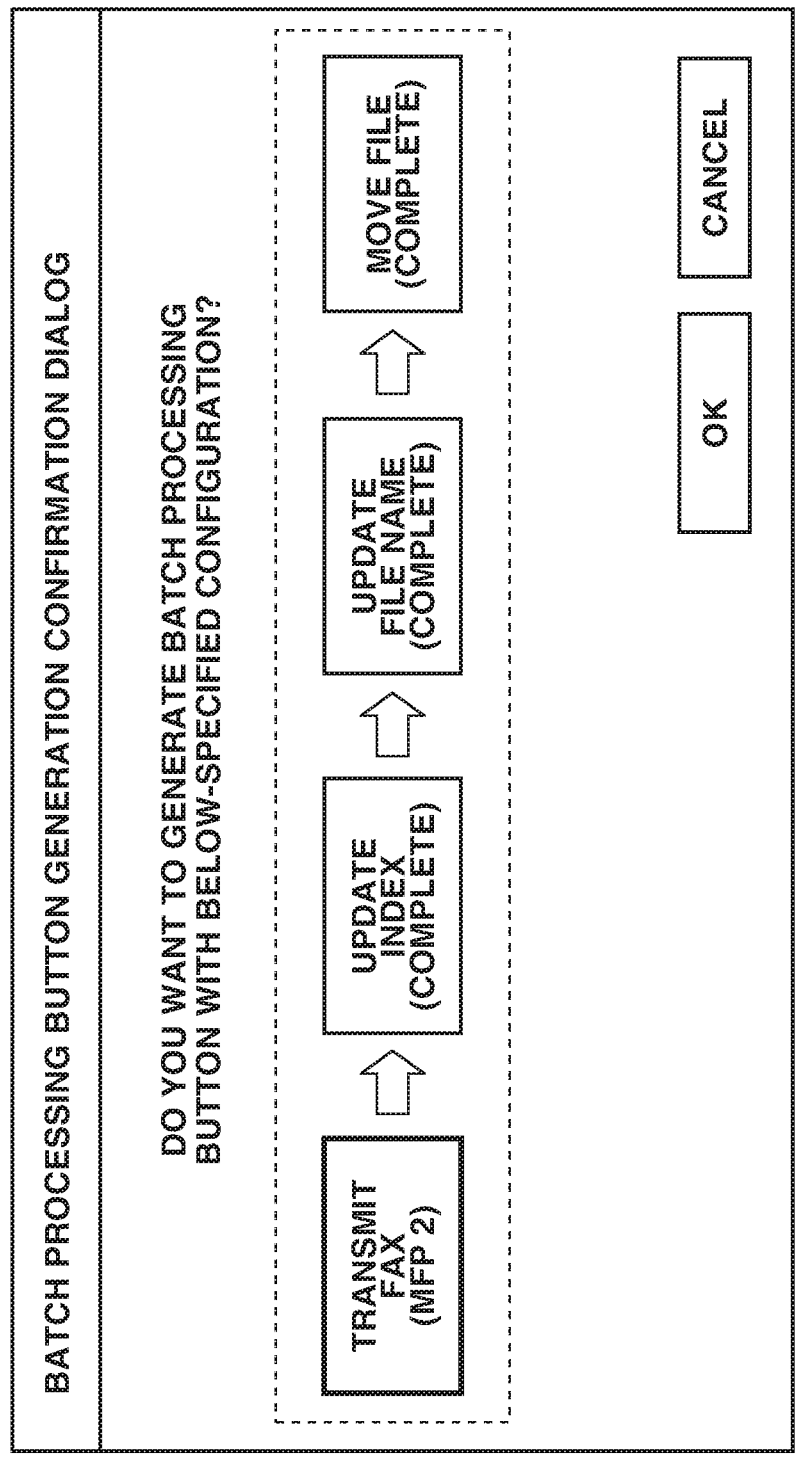
FIG. 18 is a diagram illustrating an example of a batch processing button generation dialog.

In step S1001 in the first exemplary embodiment, the user selection of the single processing button triggers the display of the execution confirmation dialog 1100 (step S1007) and the dialog 800 (step S1014) and generation of the batch processing button including the user-selected single processing button. However, the trigger for the generation of the batch processing button is not limited to the press of the single processing button. More specifically, the user selects a processing button on the processing button list display pane 802, which is displayed at a press of the "Generate Batch Processing Button" 515. The selecting operation triggers execution of steps S1001 to S1006 and S1012 and S1013, and a generation confirmation dialog (FIG. 18) is displayed. More specifically, the batch processing button can be generated without performing the confirmation of execution in step S1007.

While whether the process corresponding to the batch processing button includes the process of the same processing type as the single processing button 514 pressed by the user is determined in step S1304 in the first exemplary embodiment, the determination method is not limited to the above-described method. Whether the process corresponding to the batch processing button includes a process that is of the same processing type as the user-pressed single processing button but is different in the setting content can be determined in step S1304. In this determination method, even if there is a batch processing button including the user-selected single processing button, generation of a batch processing button of the same processing content in step S1014 can be avoided.

Embodiment(s) can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the disclosure has been described with reference to exemplary embodiments, it is to be understood that the embodiments are not limited to the disclosed exemplary embodiments. The scope of the following claims is to be accorded the broadest interpretation so as to encompass all such modifications and equivalent structures and functions.

This application claims the benefit of Japanese Patent Application No. 2018-131010, filed Jul. 10, 2018, which is hereby incorporated by reference herein in its entirety.

What is claimed is:

1. An information processing apparatus comprising:
a display control unit configured to display a single processing button for instructing for executing a process and a batch processing button for instructing for executing a plurality of processes, wherein the process is to execute one function based on setting information;
a determination unit configured to determine whether there is a first batch processing button or not in a case where a first single processing button is selected, wherein the first batch processing button is a batch processing button for executing a plurality of processes including at least a process to execute a first function using first setting information, and wherein the first single processing button is a single processing button for executing the first function using second setting information which is different from the first setting information; and
a generation unit configured to, upon determining by the determination unit that there is the first batch processing button, based on the plurality of processes corresponding to the first batch processing button, generate a second batch processing button whose plurality of processes includes a process to execute the first function using the second setting information.

2. The information processing apparatus according to claim 1, wherein in a case where the determination unit determines that there is not the first batch processing button, the generation unit does not generate the second batch processing button.

3. The information processing apparatus according to claim 1, further comprising a confirmation unit configured to prompt a user to confirm, via a first screen, whether the generation unit is to generate the second batch processing button in the case where the determination unit determines that there is the first batch processing button.

4. The information processing apparatus according to claim 3, wherein the first screen includes at least information for enabling the user to recognize a sequential order of execution of each process included in a new plurality of processes.

5. The information processing apparatus according to claim 1, further comprising a display unit configured to display a second screen for prompting the user to confirm whether to execute a process corresponding to the second batch processing button in a case where the first single processing button is selected by the user operation and the determination unit determines that there is the first batch processing button.

6. The information processing apparatus according to claim 5,
wherein the second screen includes a first operation unit for prompting the user to select a new plurality of processes to be executed and a second operation unit for prompting the user to select the new plurality of processes not to be executed, and
wherein in a case where the second operation unit is selected, only the process corresponding to the first single processing button selected by the user operation is executed.

7. The information processing apparatus according to claim 1, wherein the first setting information comprises a condition that is set in a case of executing a process on the document data.

8. The information processing apparatus according to claim 1, wherein the generation unit generates the second batch processing button for executing a plurality of processes obtained by replacing, with the process to execute the first function using the second setting information, the process to execute the first function using the first information among the plurality of processes corresponding to the first batch processing button.

9. The information processing apparatus according to claim 1, wherein the first setting information corresponds to a first printing apparatus, and the second information corresponds to a second printing apparatus which is different from the first printing apparatus.

10. A non-transitory computer-readable storage medium storing a computer program for causing an information processing apparatus to perform a method, the method comprising:
display a single processing button for instructing for executing a process and a batch processing button for instructing for executing a plurality of processes, wherein the process is to execute one function based on setting information;
determining, whether there is a first batch processing button or not in a case where a first single processing button is selected, wherein the first batch processing button is a batch processing button for executing a plurality of processes including at least a process to execute a first function using first setting information, and wherein the first single processing button is a single processing button for executing the first function using second setting information which is different from the first setting information; and
generating, upon determining that there is the first batch processing button, based on the plurality of processes corresponding to the first batch processing button, a second batch processing button whose plurality of processes includes a process to execute the first function using the second setting information.

11. A method of controlling an information processing apparatus, the method comprising:
display a single processing button for instructing for executing a process and a batch processing button for instructing for executing a plurality of processes, wherein the process is to execute one function based on setting information;
determining, whether there is a first batch processing button or not in a case where a first single processing button is selected, wherein the first batch processing button is a batch processing button for executing a plurality of processes including at least a process to execute a first function using first setting information, and wherein the first single processing button is a single processing button for executing the first function using second setting information which is different from the first setting information; and
generating, upon determining that there is the first batch processing button, based on the plurality of processes corresponding to the first batch processing button, a second batch processing button whose plurality of processes includes a process to execute the first function using the second setting information.

* * * * *